US012469357B2

(12) United States Patent
Sumi et al.

(10) Patent No.: US 12,469,357 B2
(45) Date of Patent: Nov. 11, 2025

(54) ILLUMINATION DEVICE AND GAMING MACHINE EQUIPPED WITH SAME

(71) Applicant: OMRON CORPORATION, Kyoto (JP)

(72) Inventors: Masaaki Sumi, Kyoto (JP); Eiji Yasuda, Kyoto (JP); Takahiro Ono, Kyoto (JP); Takehiro Agata, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 302 days.

(21) Appl. No.: 18/305,436

(22) Filed: Apr. 24, 2023

(65) Prior Publication Data

US 2023/0368606 A1 Nov. 16, 2023

(30) Foreign Application Priority Data

May 16, 2022 (JP) ................................ 2022-079970

(51) Int. Cl.
*A63F 13/00* (2014.01)
*G07F 17/32* (2006.01)

(52) U.S. Cl.
CPC ...... *G07F 17/3216* (2013.01); *G07F 17/3258* (2013.01); *G07F 17/329* (2013.01)

(58) Field of Classification Search
None
See application file for complete search history.

(56) References Cited

U.S. PATENT DOCUMENTS

| | | | | |
|---|---|---|---|---|
| 7,311,607 B2 * | 12/2007 | Tedsen | G07F 17/3211 | 463/32 |
| 7,862,422 B2 * | 1/2011 | Garamendi | G07F 17/3211 | 463/20 |
| 2003/0064799 A1 * | 4/2003 | Goins | G07F 17/3211 | 463/20 |
| 2004/0000754 A1 * | 1/2004 | Inoue | G07F 17/3213 | 273/143 R |
| 2004/0192430 A1 * | 9/2004 | Burak | G02B 30/50 | 463/20 |
| 2004/0214630 A1 * | 10/2004 | Mayeroff | G07F 17/34 | 463/20 |
| 2008/0242408 A1 * | 10/2008 | Hwang | G07F 17/3202 | 463/31 |
| 2009/0029761 A1 | 1/2009 | Nagano | | |

FOREIGN PATENT DOCUMENTS

JP 2009-28132 A 2/2009

* cited by examiner

*Primary Examiner* — Sunit Pandya
(74) *Attorney, Agent, or Firm* — METROLEX IP LAW GROUP, PLLC; Robert L. Scott, Esq.

(57) ABSTRACT

An illumination device 10 includes a reel 13*a*, a motor 13*e*, a roulette wheel 14*c*, a motor 14*i*, and LED tapes 14*ba* and 14*bb*. The reel 13*a* has a substantially cylindrical shape, rotates around a rotary shaft, and has a substantially circular first side surface, a second side surface that is disposed opposite the first side surface, and an outer peripheral surface that connects the first side surface and the second side surface. The motor 13*e* rotates the reel 13*a* around a substantially cylindrical center shaft. The roulette wheel 14*c* is provided inside the reel 13*a* when viewed from a side of the first side surface, and has a roulette graphics formed thereon. The motor 14*i* rotates the roulette wheel 14*c* around the center thereof. The LED tapes 14*ba* and 14*bb* are provided to the reel 13*a* and produce effects with light.

14 Claims, 16 Drawing Sheets

ILLUMINATION DEVICE AND GAMING MACHINE EQUIPPED WITH SAME

CROSS-REFERENCE TO RELATED APPLICATIONS

THIS APPLICATION CLAIMS PRIORITY TO JAPANESE PATENT APPLICATION NO. 2022-079970 FILED ON May 16, 2022. THE ENTIRE DISCLOSURE OF JAPANESE PATENT APPLICATION NO. 2022-079970 IS HEREBY INCORPORATED HEREIN BY REFERENCE.

BACKGROUND

Technical Field

The present invention relates to an illumination device installed, for example, in a gaming machine located in a casino or other such gaming facility, as well as to a gaming machine provided with this illumination device.

Description of the Related Art

In recent years, illumination devices that give effects using light sources such as LEDs (light emitting diodes) have been installed around gaming machines in casinos and other such amusement facilities.

For example, Patent Literature 1 discloses a topper device for a gaming machine in which, when there is a win on one of the slot machines constituting a linked system, a win signal is transmitted from the winning slot machine to an installed topper device, and upon receiving this winning signal, the topper device sends an effect signal indicating that a slot machine has won to the other linked topper devices, and executes an effect that guides a position of the winning slot machine by using the topper liquid crystal panel or LED.

CITATION LIST

Patent Literature

Patent Literature 1: JP-A 2009-028132

SUMMARY

Problem to be Solved by the Invention

However, the following problems are encountered with the above conventional topper device for a gaming machine.

The illumination device included in the topper device for a gaming machine disclosed in the above publication is installed on the upper part of a slot machine or other such gaming machine, and various effects are produced by combining a liquid crystal panel that displays various effect screens with LEDs that are provided around the liquid crystal panel, so a problem with this configuration is that the effect ends up being uniform and flat.

It is an object of the present invention to provide an illumination device with which a three-dimensional and distinctive effect can be obtained, as well as a gaming machine equipped with this illumination device.

Means for Solving Problem

The illumination device according to the first invention is an illumination device installed in a gaming machine, comprising a rotating body, a first rotary drive unit, a disk-shaped member, a second rotary drive unit, and an decorative illumination unit. The rotating body has a substantially cylindrical shape and rotates around a rotary shaft, and has a substantially circular first side surface, a second side surface that is disposed opposite the first side surface, and an outer peripheral surface that connects the first side surface and the second side surface. The first rotary drive unit rotates the rotating body around a substantially cylindrical center shaft. The disk-shaped member is provided inside the rotating body when viewed from a side of the first side surface and has a first graphic formed thereon. The second rotary drive unit that rotates the disk-shaped member as a rotational center of the center of the disk-shaped member. The decorative illumination unit is provided to the rotating body and gives an effect with light.

Here, for example, an illumination device installed in a gaming machine located in a casino or other such gaming facility and performs various effects comprises a substantially cylindrical rotating body that is rotationally driven, a disk-shaped member that is provided inside the rotating body and is rotationally driven, and an decorative illumination unit that is provided to the rotating body and gives an effect with light.

Here, pictures, text, or the like for performing a jackpot lottery are displayed on the outer peripheral surface of the rotating body, for example, and the rotating body is rotationally driven according to the state of play on the gaming machine.

A roulette graphics or the like is displayed on the disk-shaped member, for example, and the disk-shaped member is rotationally driven according to the state of play on the gaming machine.

The decorative illumination unit includes a light source unit such as an LED (light emitting diode), is provided inside the rotating body, and performs various effects by irradiating all or part of the rotating body and/or the disk-shaped member with light.

Consequently, by combining the rotation of the rotating body, the rotation of the disk-shaped member provided inside the rotating body, and the lighting effect produced by the decorative illumination unit provided to the rotating body, many different effects can be produced to match the state of play on the gaming machine.

As a result, a three-dimensional and distinctive effect can be obtained.

The illumination device according to the second invention is the illumination device according to the first invention, wherein the decorative illumination unit has a first light source unit that emits light in a specific direction, and a light guide plate that has an incident surface on which the light emitted from the first light source unit is incident and an exit surface from which the light incident from the incident surface is emitted, and that is disposed on the side of the disk-shaped member on which the first graphic is formed.

Consequently, the desired display is performed on the light guide plate by causing the light from the first light source unit to be incident on the incident surface of the light guide plate, and the first light source unit can be turned off to display the first graphic of the disk-shaped member disposed on the back side of the light guide plate through the light guide plate.

The illumination device pertaining to the third invention is the illumination device pertaining to the second invention, further comprising a first display control unit that controls the first light source unit so as to switch the display of a plurality of graphics on the substantially circular first side surface of the rotating body depending on whether or not the incident surface of the light guide plate is lit, according to the state of play on the gaming machine.

Consequently, when a signal indicating a game state such as a jackpot win is received from the gaming machine, for example, the display on the first side surface of the rotating body can be switched by controlling the first light source unit so that light will be incident on the incident surface of the light guide plate.

The illumination device according to the fourth invention is the illumination device according to the third invention, wherein, on the first side surface, the first display control unit causes a second graphic to be displayed by the light reflected by a plurality of prisms that are disposed in a specific pattern on the light guide plate and reflect, in a specific direction, the light emitted from the first light source unit onto the incident surface when the first light source unit is controlled so as to irradiate the light guide plate with light, and causes the first graphic of the disk-shaped member disposed on the back side of the light guide plate to be displayed through the light guide plate when the first light source unit is controlled so as not to irradiate the light guide plate with light.

Consequently, because light is made to be incident on the incident surface of the light guide plate, the plurality of prisms formed on the light guide plate reflect the light inside the light guide plate, and the desired second graphic can be displayed while hiding the first graphic of the disk-shaped member disposed on the back side of the light guide plate. By turning off the first light source unit, the first graphic of the disk-shaped member disposed on the back side of the light guide plate can be displayed through the light guide plate.

The illumination device according to the fifth invention is the illumination device according to the fourth invention, wherein the decorative illumination unit further has a second light source unit that is disposed on the back side of the disk-shaped member and emits light toward a part of the disk-shaped member, and the illumination device further comprises a second display control unit that controls the second light source unit so as to display part of the graphic of the disk-shaped member.

Consequently, the second light source unit disposed on the back side of the disk-shaped member is lit according to the state of game play on the gaming machine, for example, so part of the disk-shaped member can be irradiated, and only a part of the first graphic can be highlighted in the display.

The illumination device according to the sixth invention is the illumination device according to the fifth invention, wherein the first display control unit controls the first light source unit to irradiate the light guide plate with light on the first side surface, and causes a second graphic to be displayed by the light reflected by a plurality of prisms that are disposed in a specific pattern on the light guide plate and that reflect, in a specific direction, the light emitted from the first light source unit onto the incident surface, and in this state, the second display control unit controls the second light source unit to display part of the graphic on the disk-shaped member, whereupon a part of the first graphic on the disk-shaped member is displayed on the first side surface through a part of the second graphic.

Consequently, in a state in which light is incident on the light guide plate and the second graphic is displayed on the light guide plate, if, for example, the second light source unit disposed on the back side of the disk-shaped member is lit at a higher quantity of light than the first light source unit, the light will pass through part of the disk-shaped member while also passing through the second graphic of the light guide plate, so that just a part of the first graphic can be highlighted in the display.

The illumination device according to the seventh invention is the illumination device according to the third invention, wherein the decorative illumination unit further has a fifth light source unit that emits light onto the surface of the first graphic of the disk-shaped member, and a fifth display control unit that controls the fifth light source unit so as to irradiate the surface of the first graphic with light in a state in which the first display control unit controls the first light source unit so as not to irradiate the light guide plate on the first side surface, and the first graphic of the disk-shaped member disposed on the back side of the light guide plate is displayed through the light guide plate.

Consequently, because the surface of the first graphic is irradiated with light from the fifth light source unit, the light will pass through the light guide plate in a state in which the light guide plate is not being irradiated with light, which makes the first graphic easier to see on the disk-shaped member disposed on the back side of the light guide plate.

The illumination device according to the eighth invention is the illumination device according to any of the first to seventh inventions, wherein the decorative illumination unit further has a design sheet that is provided on a side of the second side surface of the rotating body, has a specific graphic formed thereon, blocks light from the second side surface, and transmits light from the first side surface.

Consequently, a design sheet having a half-mirror function, which blocks light from the second side surface and transmits light from a side of the first side surface, is disposed on the second side surface on the opposite side from the first side surface on which the light guide plate and the like are disposed in the substantially cylindrical rotating body, which allows for a different display on a side of the second side surface than that on a side of the first side surface.

The illumination device according to the ninth invention is the illumination device according to the eighth invention, wherein the decorative illumination unit further has a reflector that is disposed on the back side of the design sheet when viewed from a side of the second side surface, and reflects light from the design sheet side.

Consequently, because a reflector with a reflective function is disposed on the back side of a design sheet having a half-mirror function, the design sheet and the reflector can be used to create a display that functions as an infinity mirror.

The illumination device according to the tenth is the illumination device according to the ninth invention, wherein the decorative illumination unit further has a third light source unit that is provided in a space between the design sheet and the reflector inside the rotating body and emits light in the desired direction, and a third display control unit that controls the third light source unit so as to switch the light on or off.

Consequently, the light emitted from the third light source disposed between the design sheet and the reflector can produce a display with depth when viewed from a side of the second side surface.

The illumination device according to the eleventh invention is the illumination device according to the tenth invention, wherein the reflector reflects the light emitted from the third light source unit toward the second side surface, and the light reflected by the reflector is transmitted through the design sheet provided on a side of the second side surface.

Consequently, the light emitted from the third light source unit is reflected by the reflector and is transmitted from the second side to the outside through the design sheet having a half-mirror function, and this creates an effect as an infinity mirror on a side of the second side surface.

The illumination device pertaining to the twelfth invention is the illumination device pertaining to any of the first to seventh inventions, wherein the decorative illumination unit further has a fourth light source unit that emits light from a side of the inner peripheral surface of the rotating body, and the illumination device further comprises a fourth display control unit that controls the fourth light source unit so as to display a specific graphic on the outer peripheral surface of the rotating body.

Consequently, because light from the fourth light source is emitted toward the outer peripheral surface of the substantially cylindrical rotating body, a specific graphic can be displayed on the outer peripheral surface of the rotating body according to the state of game play on the gaming machine, for example.

The illumination device according to the thirteenth invention is the illumination device according to any of the first to seventh invention, further comprising a base portion that supports the rotating body so as to be rotatable by the first rotary drive unit, and a third rotary drive unit that rotates the rotating body supported by the base portion around a rotary shaft disposed along a substantially vertical direction.

Consequently, because the rotating body is rotated with respect to the base portion that supports the rotating body, the orientation of the rotating body can be switched so that the first side surface, the outer peripheral surface, and the second side surface of the rotating body will be facing a player who is playing a game in front of the gaming machine, for example.

The illumination device pertaining to the fourteenth invention is the illumination device pertaining to any of the first to seventh inventions, wherein the rotating body includes a first lottery unit for performing a jackpot lottery, on its substantially cylindrical outer peripheral surface.

Consequently, a jackpot lottery can be performed with a first lottery unit provided on the outer peripheral surface of the substantially cylindrical rotating body according to the state of game play on the gaming machine, for example.

The illumination device pertaining to the fifteenth invention is the illumination device pertaining to any of the first to seventh inventions, wherein the first graphic of the disk-shaped member includes a second lottery unit that performs a jackpot lottery.

Consequently, a jackpot lottery can be performed with the second lottery unit, such as a roulette wheel, provided on the surface of the disk-shaped member, according to the state of game play on the gaming machine, for example.

The illumination device pertaining to the sixteenth invention is the illumination device pertaining to any of the first to seventh inventions, further comprising an effect lottery unit that performs a lottery to determine the content of the effect when a jackpot signal is received from the gaming machine.

Consequently, because a jackpot signal is received from the gaming machine and is used to determine by lottery what kind of effect is to be produced in the illumination device, many different effects can be produced in the illumination device according to the game content.

The gaming machine according to the seventeenth invention comprises the illumination device according to any of claims 1 to 7, a housing unit in which the illumination device is installed, a display unit that is provided on the front surface of the housing unit to indicate a game state, and an operation deck that is provided on the front of the housing and at the lower part of the display unit, and on which operation inputs made by a player are performed.

Consequently, it is possible to construct a gaming machine equipped with an illumination device capable of enhancing the effects by means of various three-dimensional displays according to the state of game play on the gaming machine.

Effects

A three-dimensional and distinctive effect can be obtained with the illumination device according to the present invention.

DETAILED DESCRIPTION OF THE EMBODIMENT

An illumination device 10 according to an embodiment of the present invention and a gaming machine 20 equipped with this illumination device will be described below with reference to FIGS. 1 to 16B.

In this embodiment, unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

Figure 1:
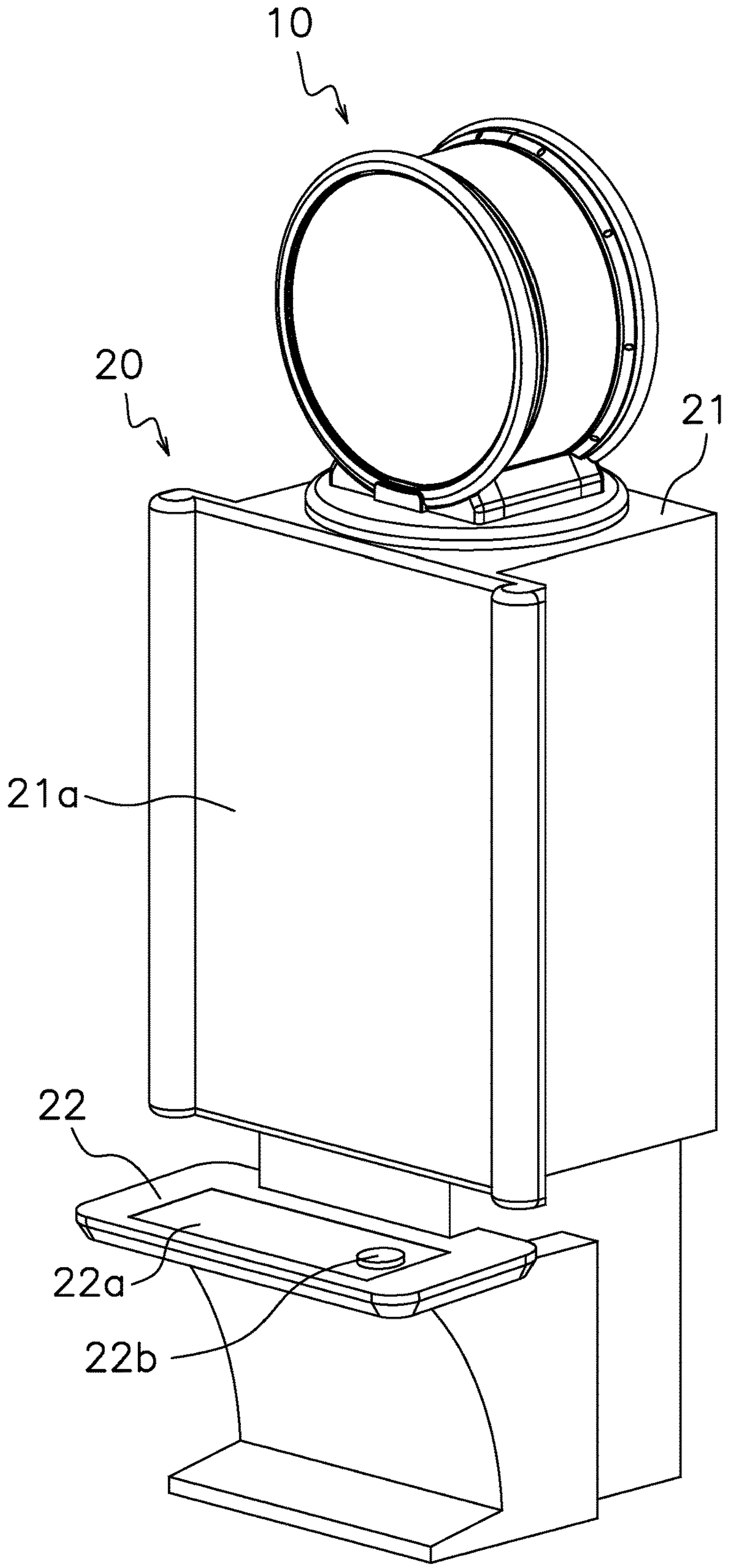
FIG. 1 is an overall oblique view of the configuration of a gaming machine equipped with the illumination device according to an embodiment of the present invention.

As shown in FIG. 1, the illumination device 10 according to this embodiment is mounted on top of a gaming machine 20, such as a slot machine installed in a casino or other such gaming facility. The illumination device 10 exhibits the effects of illumination and rotation according to the state of game play on the gaming machine 20.

(1) Configuration of Gaming Machine 20

The gaming machine 20 comprises a housing unit 21 and an operation deck 22, as shown in FIG. 1.

The housing unit 21 is a substantially cuboid member, and a display monitor 21*a* for displaying the game state is provided on the front side where the player sits.

The display monitor 21*a* displays, for example, a plurality of graphics that are rotated and stopped according to operations by the player, and the winning combination is determined by the combination of the graphics when the player's operation causes the graphics to stop. Consequently, the gaming machine 20 awards prizes according to the winning combination determined by the combination of the stopped graphics.

The operation deck 22 is provided on the upper surface of a portion provided so as to protrude toward the player at the lower portion of the housing unit 21. As shown in FIG. 1, the operation deck 22 is provided with an LCD (liquid crystal display) 22*a* and an operation button 22*b*.

The LCD 22*a* is, for example, a touch panel type of liquid crystal display device, and receives operation inputs from a player who is playing the gaming machine 20. In this embodiment, an operation for specifying the number of bets from a player playing a slot machine, an operation for rotating lottery graphics, and the like are inputted to the LCD 22*a*, for example.

Also, the LCD 22*a* is disposed at a position close to the operation button 22*b* located adjacent to the operation deck 22 on the right side.

The operation button 22*b* is an example of a gaming machine operation button included in the operation deck 22 of the gaming machine 20. For example, when starting the rotation of lottery graphics displayed on the display monitor 21*a*, this button is pressed by the player who is playing the slot machine.

(2) Configuration of Illumination Device 10

As shown in FIG. 1, the illumination device 10 of this embodiment is installed on the upper surface of the housing unit 21 of the gaming machine 20, such as a slot machine. When the illumination device 10 receives a signal (such as a jackpot signal) from the gaming machine 20, the control unit 16 shown in FIG. 2 controls the motors 13*e*, 14*i*, and 15 and the light source units included in the various constituent members. More specifically, when the illumination device 10 receives a jackpot signal from the gaming machine 20, for example, the control unit 16 determines what the effect will be on the basis of the result of the lottery in an effect lottery unit 16*b*. Then, the illumination device 10 reads a program stored in the storage unit 16*a*, and produces a wide variety of effects by controlling the light source units (LED (light emitting diode) tapes 11*d*, 14*ba*, and 14*bb* and LED boards 13*b* and 14*j*) and motors 13*e*, 14*i*, and 15 included in the various constituent members according to the effect that was determined.

Figure 3A:
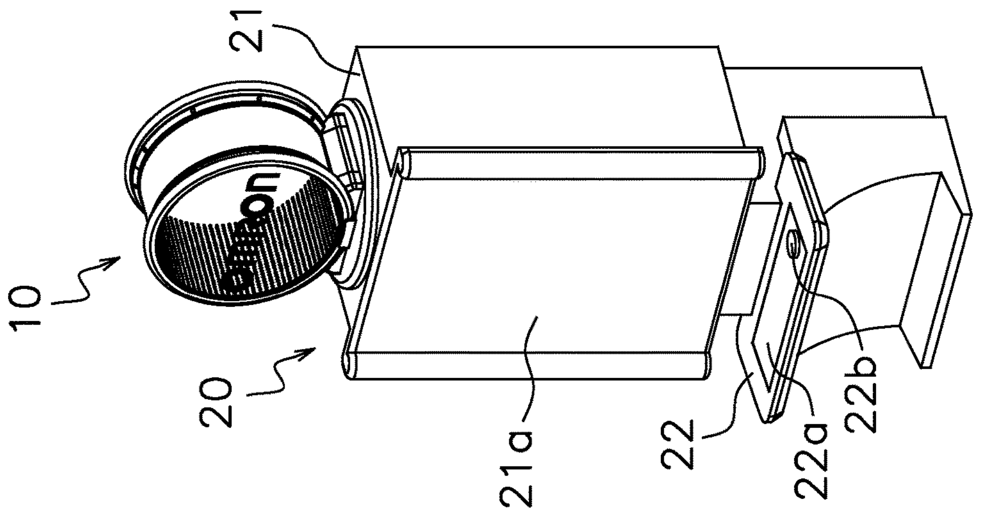
FIGS. 3A, 3B, and 3C are oblique views of a configuration in which the orientation of the illumination device in FIG. 1 is switched so that an infinity mirror unit, the outer peripheral surface of a reel, and a roulette unit, respectively, are facing the front.
Figure 3B:
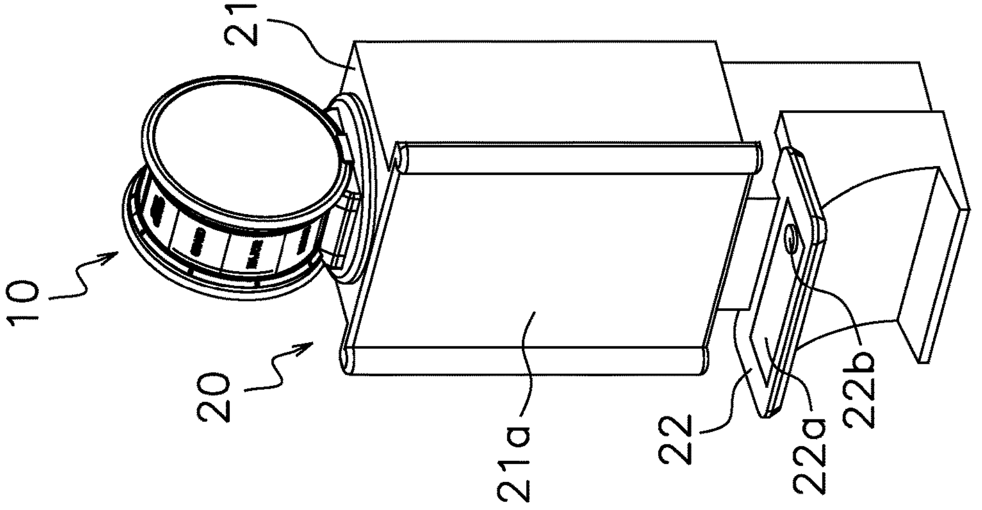
Figure 3C:
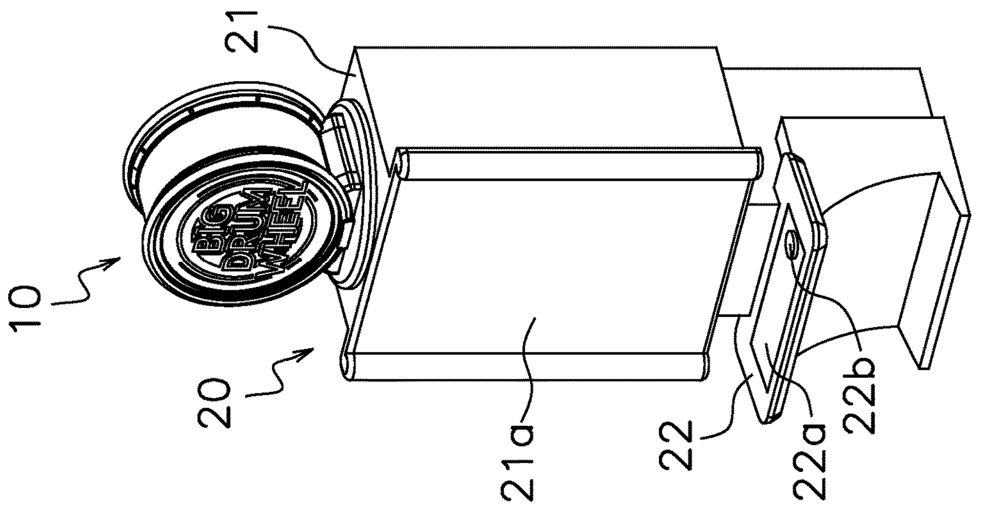

More specifically, with the illumination device 10, as shown in FIGS. 3A, 3B, and 3C, the control unit 16 controls the motor 15 (third drive unit) (see FIG. 5) to rotate the upper surface of the housing unit 21 of the gaming machine 20 around a rotary shaft extending in a substantially vertical direction, thereby switching the orientation. This allows the player who is playing in the gaming machine 20 to select which surface is facing the player from among the front surface (second surface), back surface (first surface), and side surface (outer peripheral surface) of the illumination device 10, according to the game content at that time, for example.

Also, with the illumination device 10, a motor 13*e* (see FIG. 6B) included in the reel unit 13 (discussed below) rotates a reel 13*a* around a substantially cylindrical center shaft. This allows an effect also to be obtained from the rotation of the reel unit 13.

Furthermore, with the illumination device 10, a roulette wheel 14*c* is rotationally driven by the motor 14*i* (see FIG. 6A) included in the roulette unit 14 (discussed below). As a result, a jackpot lottery can be conducted with the roulette unit 14 by spinning and stopping the roulette wheel 14*c*.

Figure 4A:
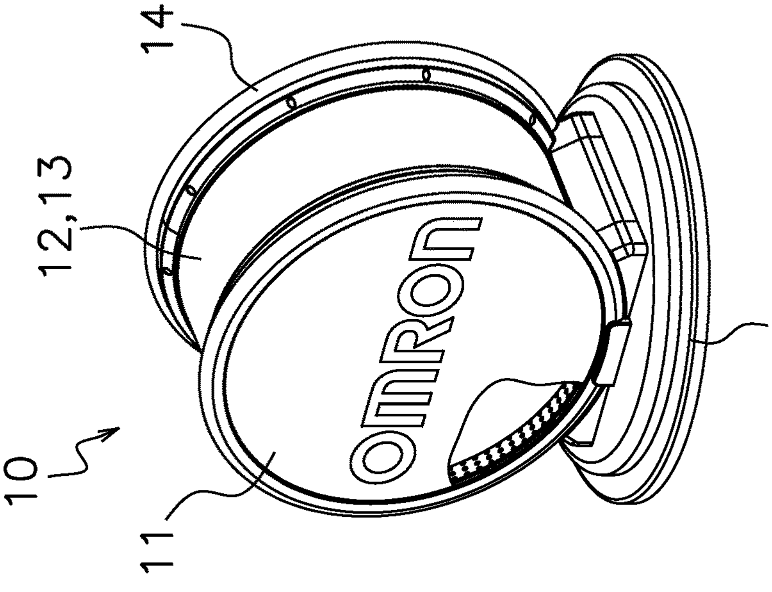
FIGS. 4A, 4B, and 4C are detail oblique views of the illumination device disposed in the orientations corresponding to FIGS. 3A, 3B, and 3C.
Figure 4B:
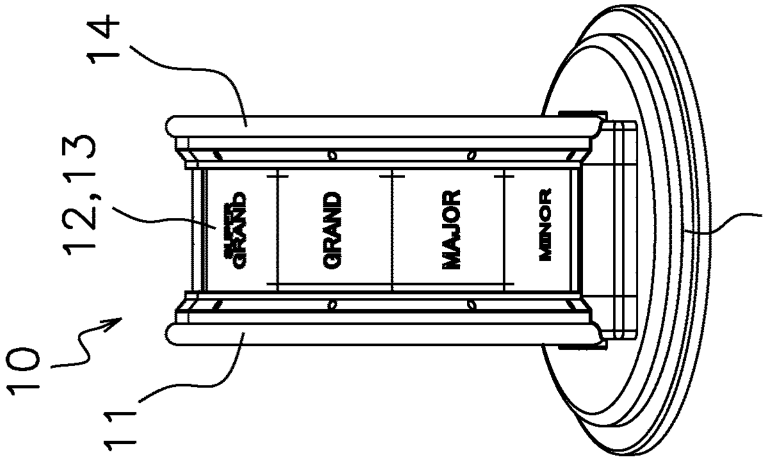
Figure 4C:
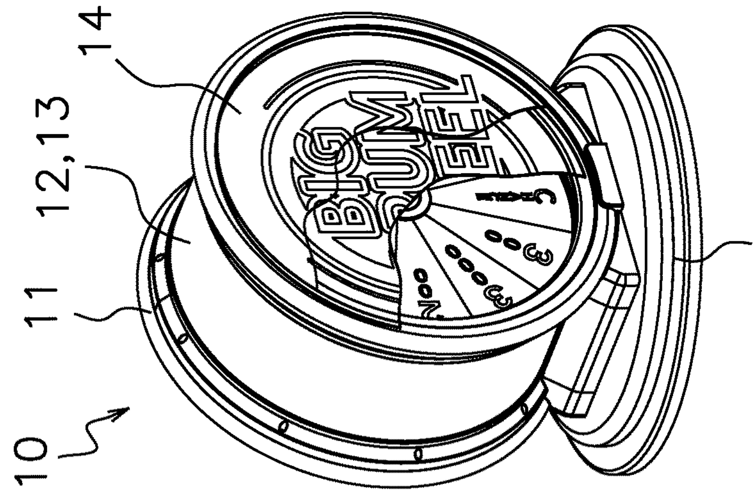
Figure 5:
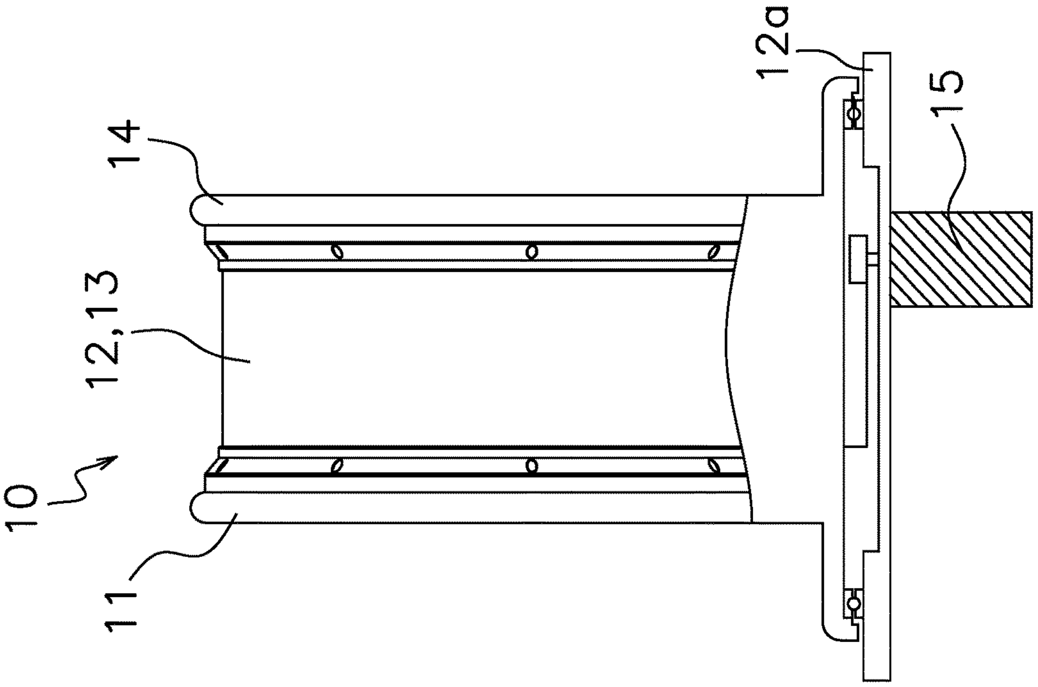
FIG. 5 is a partial cross-sectional view showing a motor for switching the orientation of the illumination device as shown in FIGS. 3A, 3B, and 3C.
Figure 6B:
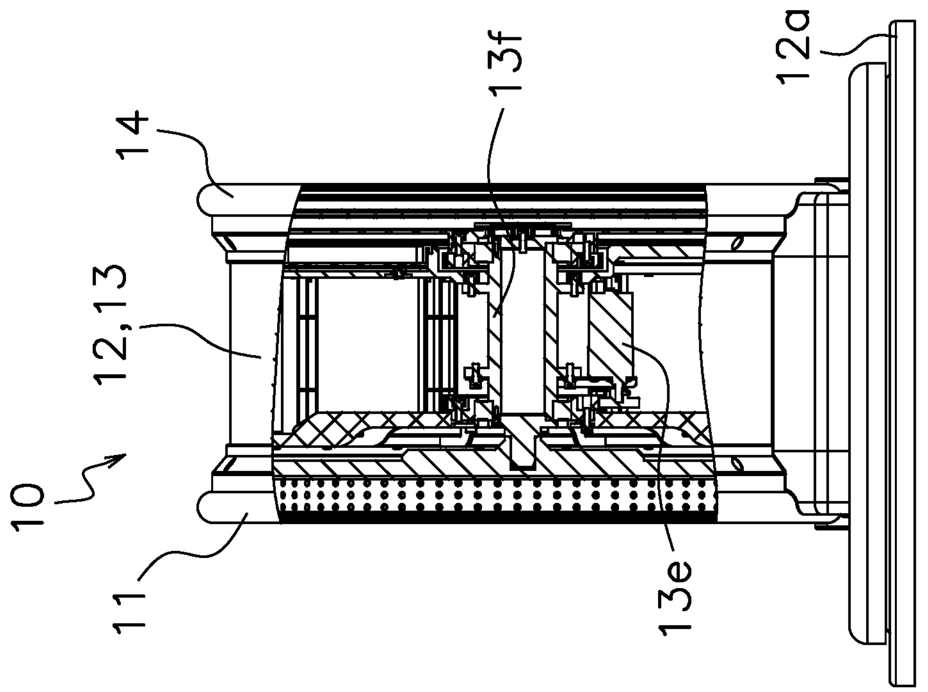
FIG. 6B is a partial cross-sectional view thereof as seen from the side.
Figure 6A:
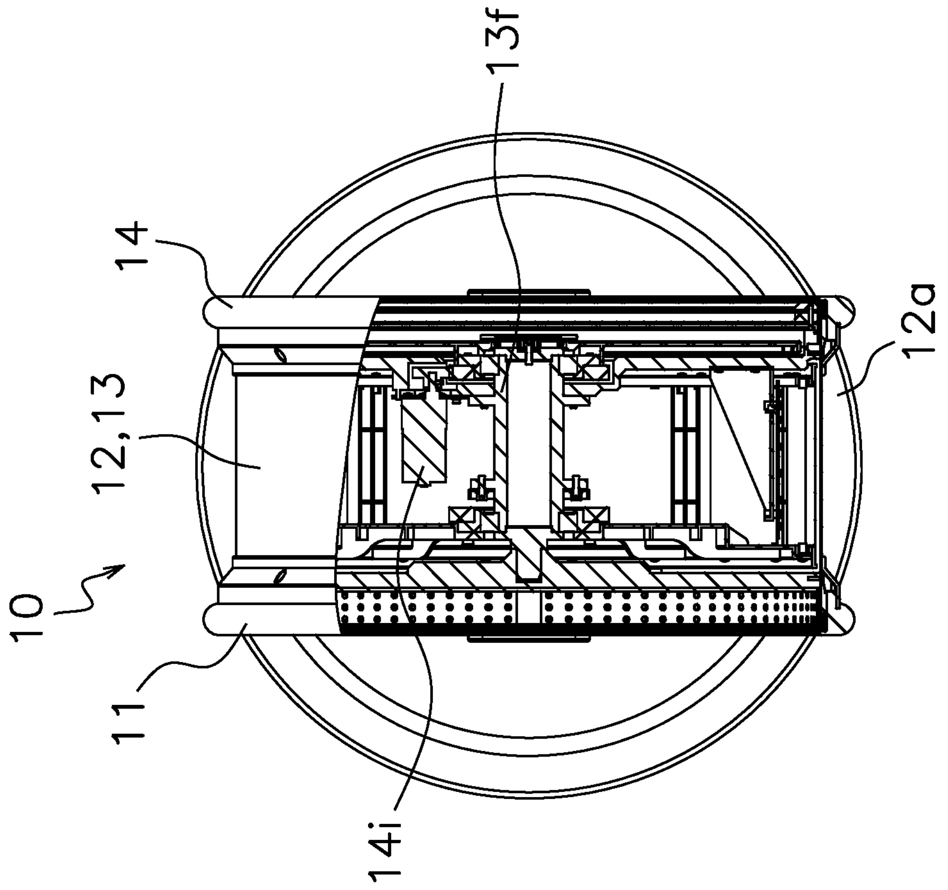
FIG. 6A is a partial cross-sectional view of the illumination device in FIG. 1 as seen from above.

As shown in FIGS. 4A, 4B, and 4C, the illumination device 10 comprises an infinity mirror unit 11, a base unit 12, a reel unit 13, a roulette unit 14, and a motor 15 (see FIG. 5).

(2-1) Infinity Mirror Unit 11

Figure 7:
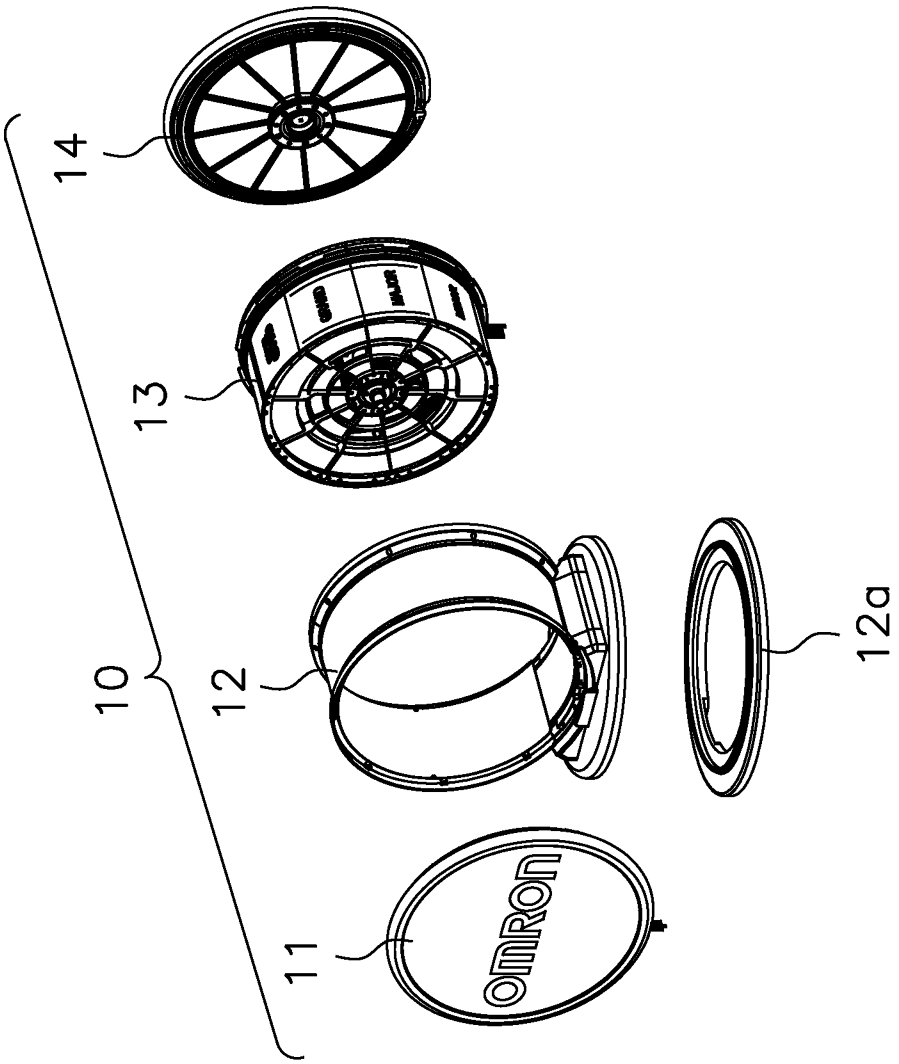
FIG. 7 is an exploded oblique view of the illumination device in FIG. 1.

The infinity mirror unit 11 functions as an infinity mirror, and as shown in FIG. 7, is disposed nearest the front surface (second surface) of all the members constituting the illumination device 10.

Figure 8:
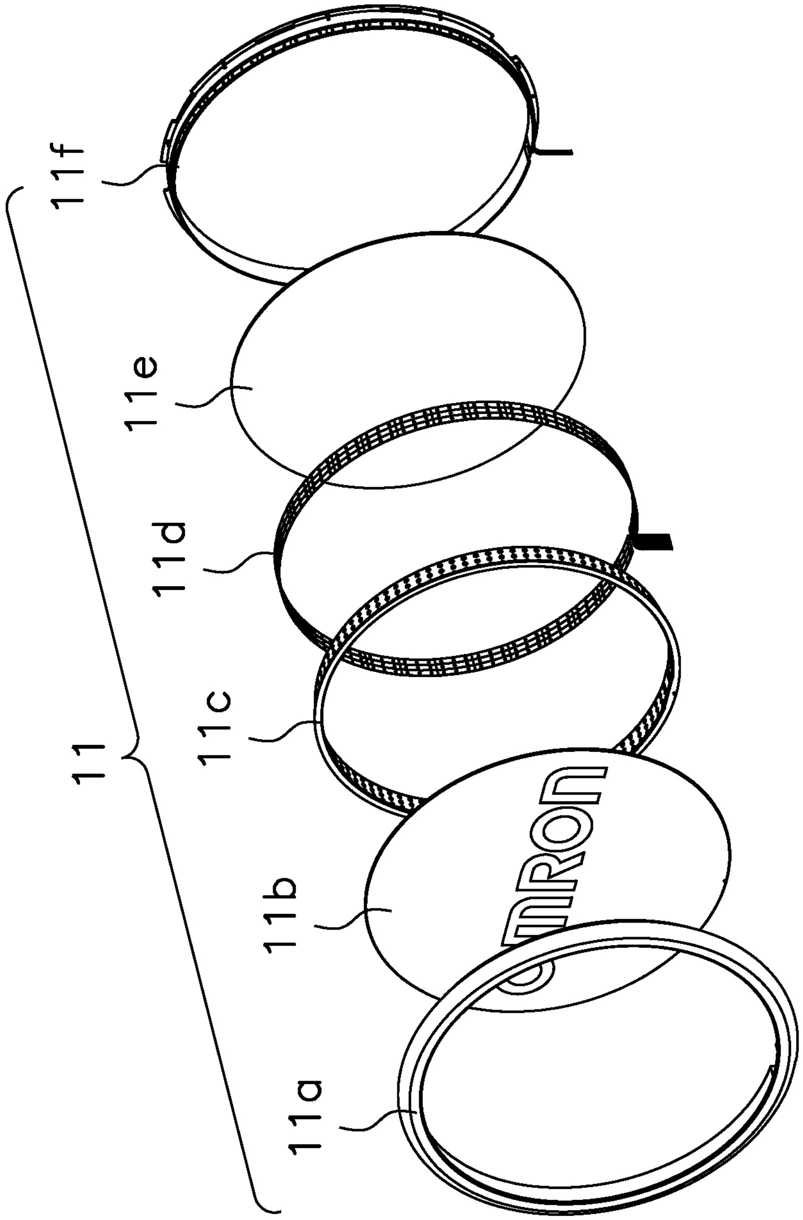
FIG. 8 is an exploded oblique view of an infinity mirror unit included in the illumination device of FIG. 7.

As shown in FIG. 8, the infinity mirror unit 11 has a diffuser 11*a*, a design sheet 11*b*, a cover 11*c*, an LED tape (illumination portion) 11*d*, a reflector 11*e*, and a frame 11*f*, in that order starting from the front side.

As shown in FIG. 8, the diffuser 11*a* is a light-transmissive, substantially annular member, and is disposed on the outer edge portion on the front side of the infinity mirror unit 11. The diffuser 11*a* is illuminated by the light emitted from an LED 11*da* included in the LED tape 11*d*, thereby exhibiting a light effect.

As shown in FIG. 8, the design sheet 11*b* is a substantially circular sheet that constitutes the front surface of the infinity mirror unit 11. When the LED 11*da* included in the LED tape 11*d* is not lit, text or graphics are displayed on the front side of the infinity mirror unit 11. The design sheet 11*b* also has a half-mirror function that does not transmit light from the front side but transmits light from the back side where the LED tape lid and the reflector lie are disposed.

The cover 11c is a substantially annular member, and is disposed so as to cover a side of the inner peripheral surface of the substantially annular LED tape 11d. The cover 11c has a plurality of holes 11ca at positions that are opposite the plurality of LEDs 11da included in the substantially annular LED tape 11d.

Figure 9B:
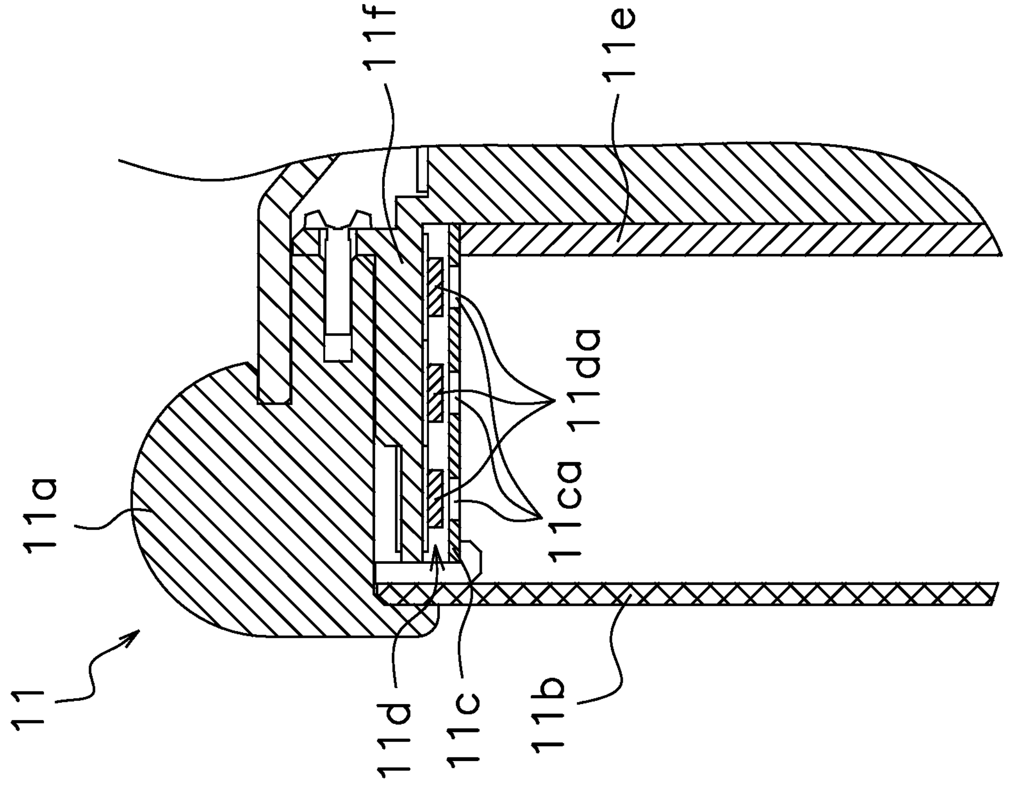
FIG. 9B is a cross-line sectional view along the A-A line in FIG. 9A.
Figure 9A:
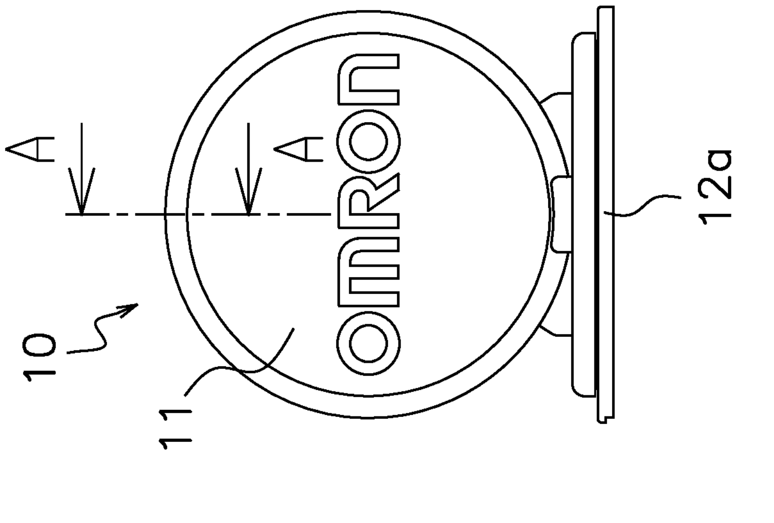
FIG. 9A is a front view of the infinity mirror unit side.

As shown in FIGS. 9A and 9B, the holes 11ca allow the light emitted from the LED 11da to pass through to a side of the inner peripheral surface.

The LED tape (decorative illumination unit) 11d is provided in the space between the design sheet 11b and the reflector 11e on the inside of the reel 13a, and emits light in the desired direction. The LED tape 11d is an decorative illumination unit for producing the infinity mirror effect of the infinity mirror unit 11, and has a plurality of LEDs 11da disposed at a specific spacing on the surface of a tape-shaped member.

As shown in FIGS. 9A and 9B, the LEDs (third light source unit) 11da are disposed in groups of three in the width direction of the LED tape 11d. A plurality of these are disposed spaced part in the lengthwise direction of the LED tape 11d. Consequently, the LEDs 11da are used as a light source that produces the infinity mirror effect of the infinity mirror unit 11.

As shown in FIG. 8, the reflector 11e is disposed so as to sandwich the LED tape 11d, etc., between itself and the design sheet 11b, and reflects light on the front side. That is, the reflector 11e reflects the light emitted from the LEDs 11da included in the LED tape 11d toward the front side.

As shown in FIG. 8, the frame 11f is a substantially cylindrical member with a bottom, and as shown in FIG. 9B, is disposed at the outer edge portion on the back side of the infinity mirror unit 11, and holds the reflector 11e, etc., from the back side at the bottom portion of the bottomed substantially cylindrical shape.

With the illumination device 10 of this embodiment, various effects can be produced by the infinity mirror unit 11 disposed on the front side.

Figure 10A:
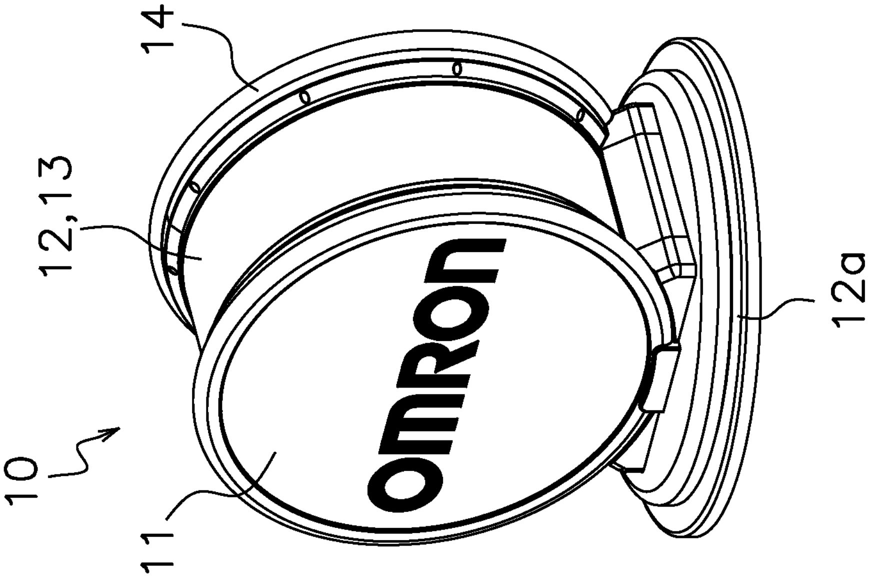
FIG. 10A is a diagram showing a state in which an LED is turned off, as a display on the infinity mirror unit side.

More specifically, when the LEDs 11da of the LED tape 11d are unlit, text, graphics, etc., provided on the design sheet 11b are displayed as shown in FIG. 10A.

Figure 10B:
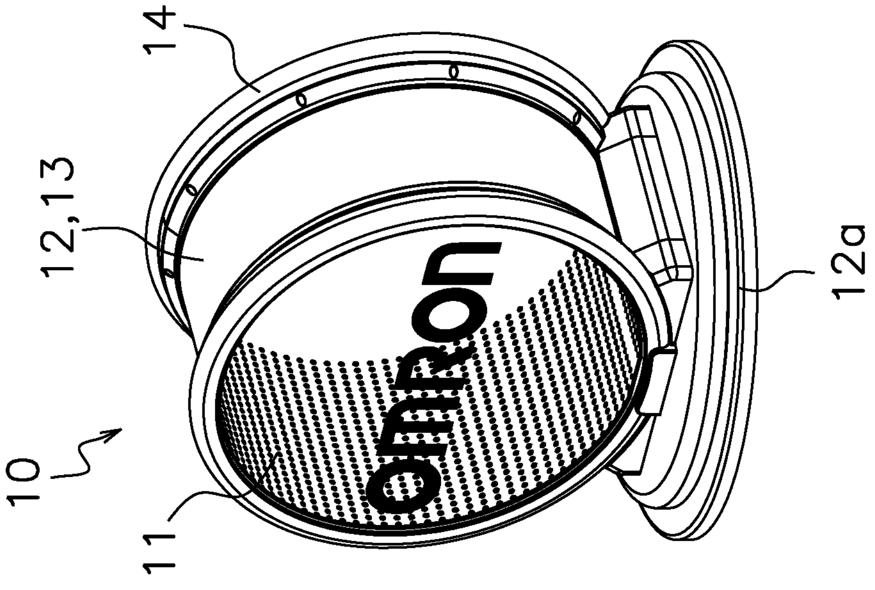
FIG. 10B is a diagram showing a state in which an LED is turned on, as a display on the side of the infinity mirror unit.

On the other hand, when the LEDs 11da of the LED tape 11d are lit, the light emitted from the LEDs 11da is transmitted and reflected by the design sheet 11b having a half-mirror function and the reflector 11e. As a result, as shown in FIG. 10B, it is possible to produce a light effect that gives a sense of depth when viewed from the front side of the infinity mirror unit 11.

(2-2) Base Unit 12

The base unit 12 is a member to which the infinity mirror unit 11, the reel unit 13, and the roulette unit 14 are each attached, and as shown in FIG. 7, is disposed so as to be sandwiched between the infinity mirror unit 11 and the roulette unit 14 along with the reel unit 13, out of the members constituting the illumination device 10. The base unit 12 has a substantially cylindrical main body portion, and the reel unit 13 is rotatably disposed on a side of the inner peripheral surface thereof. The infinity mirror unit 11 is disposed on the front side of the base unit 12, and the roulette unit 14 is disposed on the back side.

The base unit 12 is disposed on a side of the upper surface of the base portion 12a shown in FIG. 7, and is rotated with respect to the base portion 12a by the above-mentioned motor 15. The base unit 12 is a cylindrical member that is optically transmissive, and includes the reel unit 13 in a rotatable state on a side of its inner peripheral surface.

As shown in FIG. 7, the base portion 12a is a substantially annular member and is attached to the upper surface of the housing unit 21 of the gaming machine 20. The base unit 12 is rotatably disposed on a side of the upper surface of the base portion 12a.

(2-3) Reel Unit 13

As shown in FIG. 7, the reel unit 13 is disposed so as to be sandwiched between the infinity mirror unit 11 and the roulette unit 14, along with the base unit 12, among the members constituting the illumination device 10.

The reel unit 13 is disposed on a side of the substantially cylindrical inner peripheral surface of the base unit 12, and is rotationally driven by the motor 13e to perform a jackpot lottery on the illumination device 10 side according to the lottery result of the effect lottery unit 16b.

Figure 11:
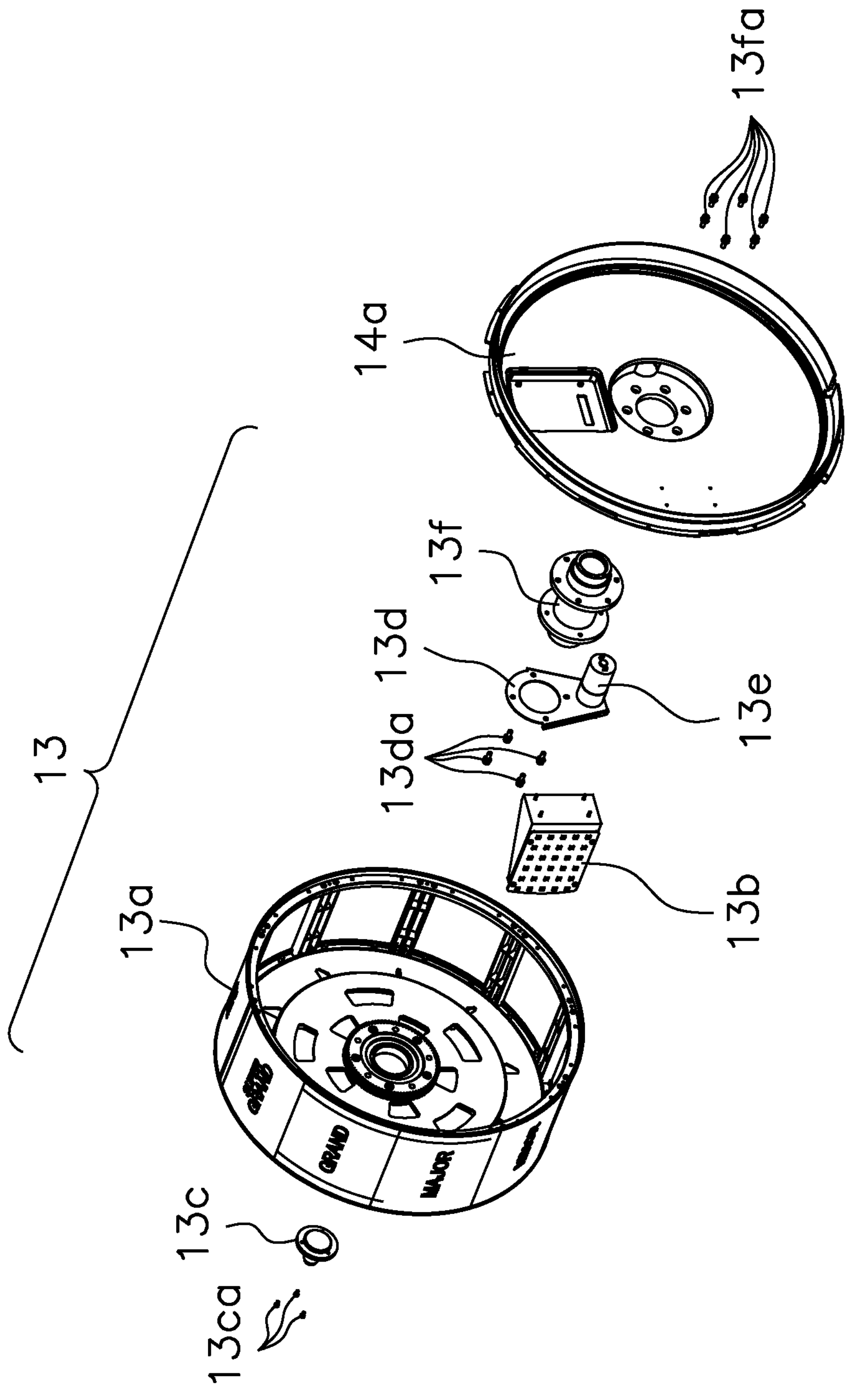
FIG. 11 is an exploded oblique view of a reel unit included in the illumination device in FIG. 7.

As shown in FIG. 11, the reel unit 13 has a reel 13a (rotating body, first lottery unit, housing unit), an LED board 13b (fourth light source unit, decorative illumination unit), a shaft support 13c, a bracket 13d, a motor 13e (first rotary drive unit), and a rotary shaft 13f.

As shown in FIG. 11, the reel 13a (rotating body, first lottery unit, housing unit) is a substantially cylindrical rotating body graphics for performing a jackpot lottery on its outer peripheral surface, and is rotationally driven by the motor 13e provided in the space on a side of the inner peripheral surface.

The graphics on the outer peripheral surface of the reel 13a include “MAJOR,” “GRAND,” “SUPER GRAND,” “MINOR,” and so forth.

As shown in FIG. 11, the LED board 13b (fourth light source unit, decorative illumination unit) is disposed and fixed on a side of the inner peripheral surface of the substantially cylindrical reel 13a, and emits light from a side of the inner peripheral surface of the reel 13a. The range of the light emitted from the LED substrate 13b substantially coincides with the size of one of the jackpot lottery graphics that are on the outer peripheral surface of the reel 13a. As a result, when the rotation of the reel 13a stops, the graphics of the reel 13a illuminated by the light from the LED board 13b are used as lottery results, so that a jackpot lottery can be performed on the reel unit 13.

As shown in FIG. 11, the shaft support 13c is fixed to the side surface of the reel 13a using a plurality of screws 13ca, and supports the center of rotation of the reel 13a.

The motor 13e that rotationally drives the reel 13a is attached to the bracket 13d, and the bracket 13d is fixed to the end surface of the rotary shaft 13f using a plurality of screws 13da.

The motor 13e (first rotary drive unit) is a rotary drive source that rotationally drives the reel 13a, and rotates the reel 13a via a plurality of gears such as a reduction gear (not shown). The control unit 16 controls the start and stop of rotation, the rotation speed, the rotation direction, and so on of the motor 13e.

As shown in FIG. 11, the rotary shaft 13f is a substantially cylindrical member that serves as the center of rotation of the reel 13a, and is disposed on a side of the inner peripheral surface of the reel 13a. The rotary shaft 13f is fixed to the base plate 14a on the roulette unit 14 side by a plurality of screws 13fa.

(2-4) Roulette Unit 14

As shown in FIG. 7, the roulette unit 14 is disposed on the rearmost surface (first surface) side of all the members constituting the illumination device 10. The roulette unit 14 produces various effects with light and rotation for a jackpot lottery on the back side of the illumination device 10.

Figure 12:
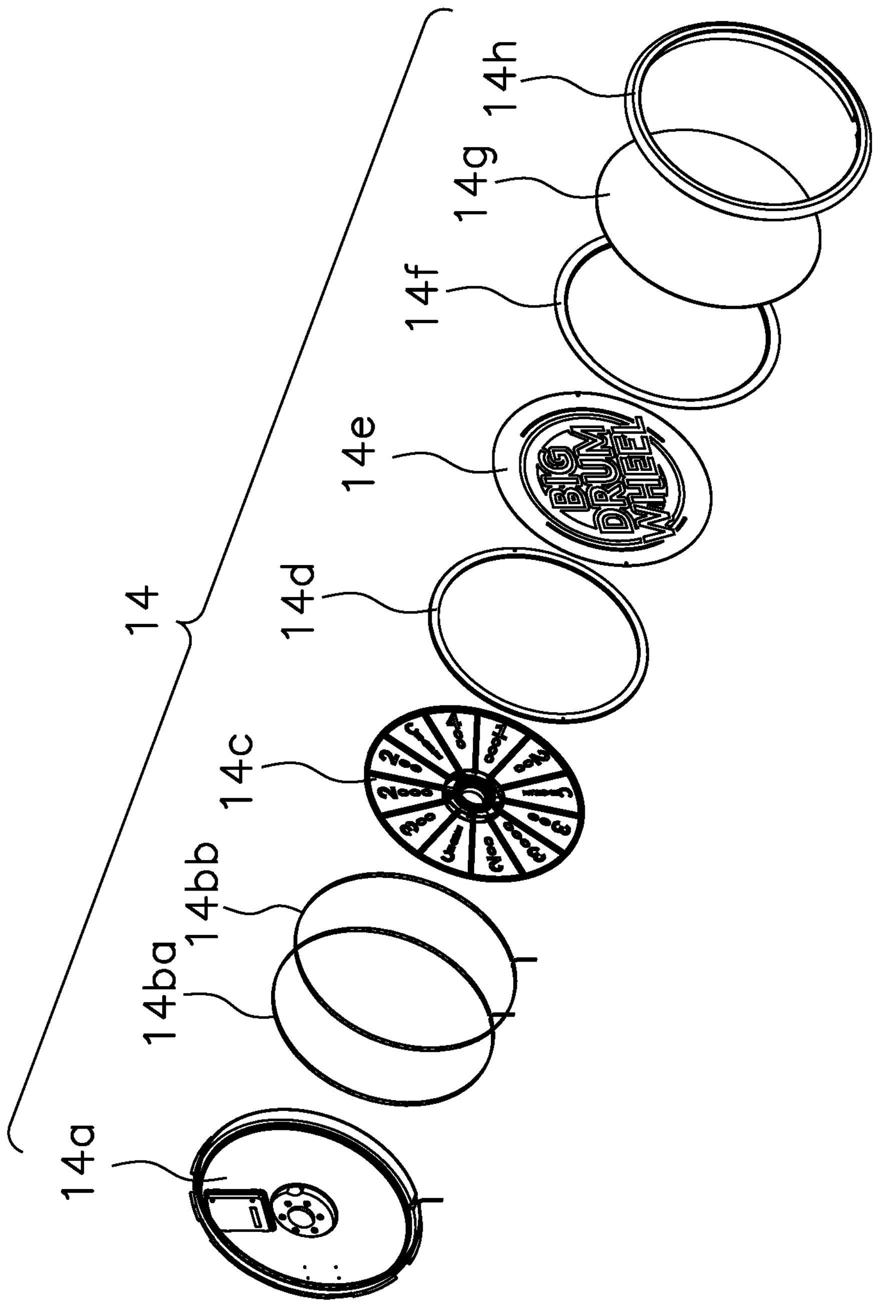
FIG. 12 is an exploded oblique view of a roulette unit included in the illumination device in FIG. 7.

As shown in FIG. 12, the roulette unit 14 has a base plate 14*a*, LED tapes 14*ba* and 14*bb*, a roulette wheel 14*c* (disk-shaped member, second lottery unit), a spacer 14*d*, a light guide plate 14*e*, a spacer 14*f*, a transparent cover 14*g*, and a diffuser 14*h*.

As shown in FIG. 12, the base plate 14*a* is a substantially cylindrical member that constitutes a side of the rear surface of the roulette unit 14, and holds the LED tapes 14*ba* and 14*bb*, the roulette wheel 14*c* (disk-shaped member, second lottery portion), the spacer 14*d*, the light guide plate 14*e*, the spacer 14*f*, and the transparent cover 14*g* between itself and the diffuser 14*h* disposed on the front side of the roulette unit 14.

Figure 13:
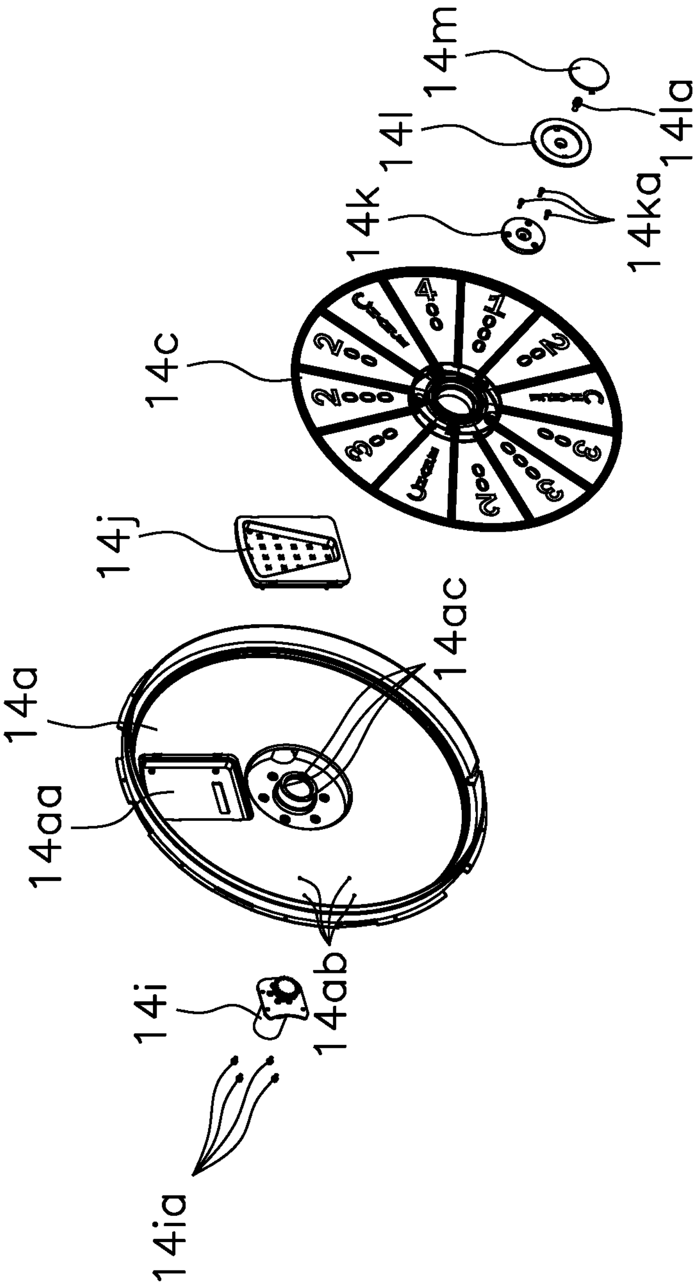
FIG. 13 is an exploded oblique view showing a more detailed configuration of the roulette unit in FIG. 12.

As shown in FIG. 13, the base plate 14*a* has a recess 14*aa*, screw holes 14*ab*, and screw holes 14*ac*.

As shown in FIG. 13, the recess 14*aa* is a recess in which an LED board 14*j* (discussed below) is attached on the front side of the base plate 14*a*, and is formed so as to substantially match the size of the LED board 14*j*.

The screw holes 14*ab* are through-holes in the base plate 14*a*, and as shown in FIG. 13, a plurality of screws 14*ia* for fixing a motor 14*i* (discussed below) to the back side of the base plate 14*a* are threaded into these holes.

As shown in FIG. 13, into the screw holes 14*ac* are threaded a plurality of screws 14*ka* for fixing a shaft support 14*k* that rotatably supports the roulette wheel 14*c* on the front side of the base plate 14*a*.

As shown in FIG. 12, the LED tapes 14*ba* and 14*bb* are decorative illumination units for producing effects in the roulette unit 14, and have a plurality of LEDs disposed at a specific spacing on the surface of a tape-shaped member. The LED tapes 14*ba* and 14*bb* are affixed to the inner peripheral surface of the substantially cylindrical base plate 14*a* and fixed in an annular shape, and a plurality of LEDs that emit light inward in the radial direction are disposed at a specific spacing.

Figure 14A:
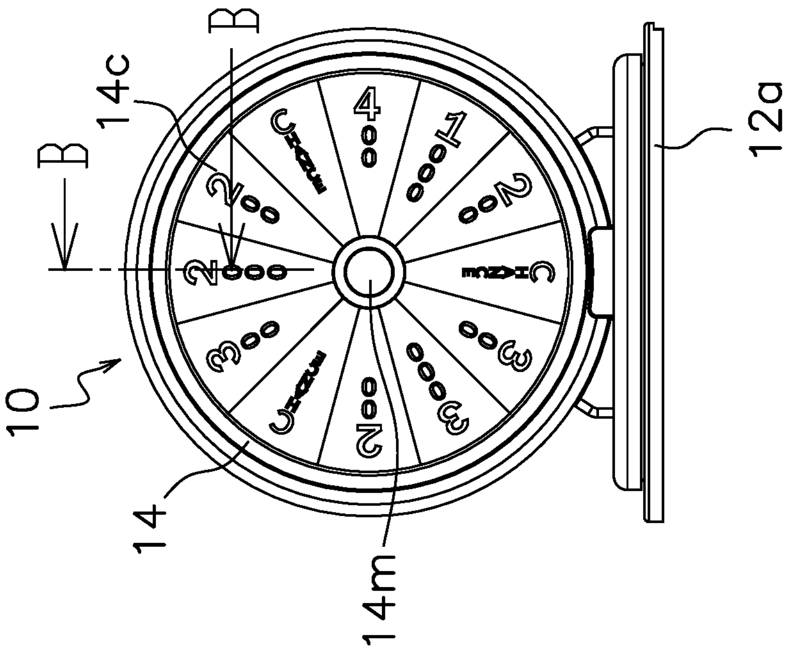
FIG. 14A is a front view of the roulette unit side.
Figure 14B:
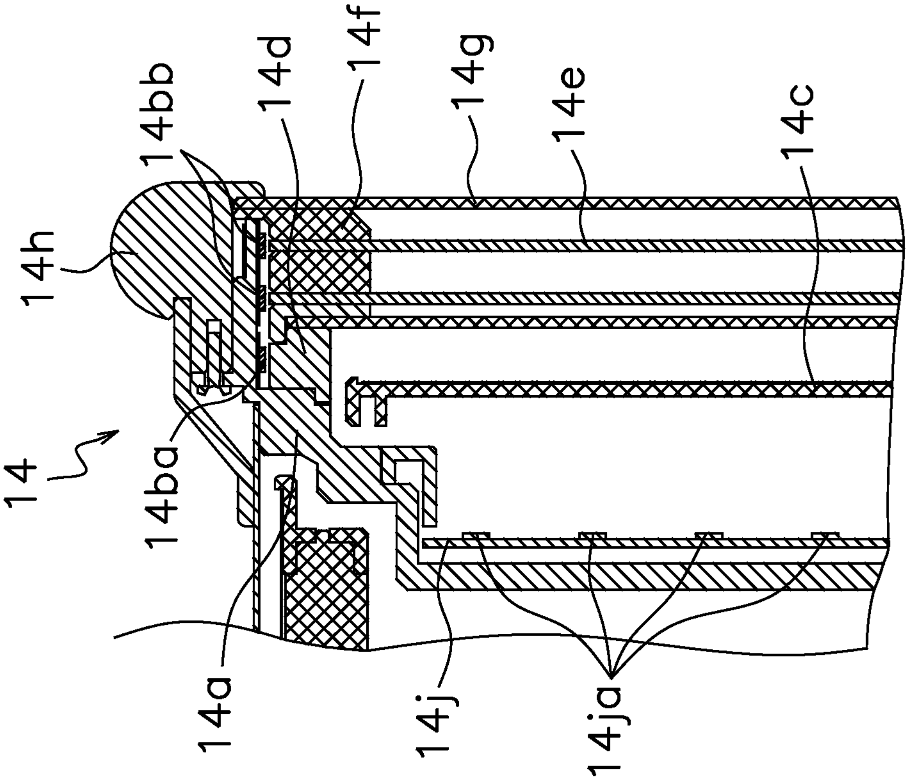
FIG. 14B is a cross-sectional view along the B-B line.

As shown in FIGS. 14A and 14B, the LED tape 14*ba* (fifth light source unit, decorative illumination unit) is disposed in a substantially annular shape on the outer peripheral side of the roulette wheel 14*c*, and emits white light, for example, so as to brightly illuminate the surface of the roulette graphics on the roulette wheel 14*c*. Consequently, the roulette wheel 14*c* can be displayed in an easy-to-see manner when viewed from the front side of the roulette unit 14.

As shown in FIGS. 14A and 14B, the LED tape 14*bb* (first light source unit, decorative illumination unit) is disposed at a position on the front side adjacent to the LED tape 14*ba*, and irradiates the end surface of the light guide plate 14*e* (discussed below) with light. Consequently, when the LEDs of the LED tape 14*bb* are lit, a display is performed by the light guide plate 14*e*, and when the LEDs are not lit, the display can be switched so that the roulette wheel 14*c* disposed on the back side is displayed through the light guide plate 14*e*.

As shown in FIGS. 12 and 13, the roulette wheel 14*c* (disk-shaped member, second lottery unit) is a rotating disk-shaped member having roulette graphics on its front surface, and performs a jackpot lottery in the roulette unit 14. The roulette graphics include, for example, numbers such as “200” and “300” . . . “3000” or characters such as “CHANGE”, respectively attached to fan-shaped areas.

As shown in FIG. 12, the spacer 14*d* is a substantially annular member provided to form a specific gap between the roulette wheel 14*c* and the light guide plate 14*e*.

As shown in FIG. 12, the light guide plate 14*e* is a substantially disk-shaped member that constitutes one of the decorative illumination units that produce light effects in the roulette unit 14, and has an end surface (incident surface) where the light emitted from the LED tape 14*bb* is incident, and a front surface (exit surface) from which the light incident from the end surface is emitted. The light guide plate 14*e* is disposed on the front side of the roulette wheel 14*c* where the roulette graphics are formed. When light from the LED tape 14*bb* is incident on the end surface of the light guide plate 14*e*, as shown in FIG. 12, the light guide plate 14*e* uses the reflection by a plurality of prisms (not shown) provided inside the light guide plate 14*e* to give a specific display of “BIG DRUM WHEEL” as seen from the front side.

At this point, when the roulette unit 14 is viewed from the front, the light guide plate 14*e* is disposed on the front side of the roulette wheel 14*c*. Therefore, in a state in which light is incident on the end surface of the light guide plate 14*e* from the LED tape 14*bb*, the roulette graphics of the roulette wheel 14*c* are hidden by the light guide plate 14*e*, and the graphics of the light guide plate 14*e* are displayed. On the other hand, in a state in which the light from the LED tape 14*bb* is not incident on the end surface of the light guide plate 14*e*, the roulette graphics of the roulette wheel 14*c* disposed on the back side are displayed because the light guide plate 14*e* is transmissive to light.

At this point, since the surface of the roulette graphics is brightly illuminated by the white light emitted from the LED tape 14*ba*, the roulette graphics can be clearly seen when viewed from the front.

The configuration may be such that one of these light guide plates that function as a shutter for switching between display and non-display of the graphics or the like disposed on the back side is provided to the front of each of the graphics on the outer peripheral surface of the reel 13*a* described above.

In this case, if a substantially transparent state is created in which light is not allowed to be incident on the incident surface of the light guide plate at the position indicating the lottery result, the lottery result can be displayed, and for the light guide plates at other positions indicating the lottery result, light is allowed to be incident on the incident surface and light is emitted from the exit surface, so the graphics on the reel on the back side can be made invisible.

As shown in FIG. 12, the spacer 14*f* is a substantially annular member provided to form a specific gap between the front surface of the light guide plate 14*e* and the diffuser 14*h*, and is disposed between the light guide plate 14*e* and the diffuser 14*h* (see FIG. 14B).

As shown in FIG. 12, the transparent cover 14*g* is a transparent disk-shaped member that covers the front side of the roulette unit 14, and its outer edge portion is fixed by the diffuser 14*h*.

As shown in FIG. 12, the diffuser 14*h* is a substantially annular member that is disposed on the frontmost side of the roulette unit 14 and is transmissive to light, and exhibits a light effect by being lit by the light emitted from the LEDs.

Furthermore, as shown in FIG. 13, the roulette unit 14 has a motor 14*i* (second rotary drive unit), an LED board 14*j* (decorative illumination unit), a shaft support 14*k*, a cover 14*l*, and a lid 14*m*.

The motor 14*i* (second rotation drive unit) is a rotary drive source for rotationally driving the roulette wheel 14*c*, and as shown in FIG. 13, is fixed with a plurality of screws 14*ia*.

The start and stop of rotation, the rotation speed, the rotation direction, and so forth of the motor 14*i* are controlled by the control unit 16.

As shown in FIG. 13, the LED board 14*j* (decorative illumination unit) is attached to a recess 14*aa* formed on the front side of the base plate 14*a*. The LED board 14*j* has a plurality of LEDs 14*ja* (second light source unit) that emit light from the back side of the roulette wheel 14*c* onto a part of the roulette graphic stopped at the 12 o'clock position, from among the roulette graphics on the roulette wheel 14*c* disposed on the front side of the base plate 14*a*.

As shown in FIGS. 14A and 14B, the LEDs 14*ja* are disposed on the back side of the roulette wheel 14*c*, and emit light so as to illuminate the graphic stopped at the 12 o'clock position on the roulette wheel 14*c*.

Consequently, when the roulette wheel 14*c* is rotated and stopped, the roulette graphic stopped at the 12 o'clock position can be selected as the lottery result.

As shown in FIG. 13, the shaft support 14*k* is a member that supports the central portion of the roulette wheel 14*c* from the front side so as to allow the roulette wheel 14*c* to rotate, and is fixed to the base plate 14*a* side by threading a plurality of screws 14*ka* into screw holes 14*ac*.

As shown in FIG. 13, the cover 14*l* is attached so as to cover the shaft support 14*k*, and is fixed to the shaft support 14*k* by a screw 14*la*.

As shown in FIG. 13, the lid 14*m* is disposed on the frontmost side of all the members constituting the center axis of the roulette wheel 14*c*, and is attached so as to cover the screw 14*la* portion of the cover 14*l*.

(2-5) Motor 15

As described above, the motor 15 is a rotary drive source that rotationally drives the illumination device 10 on the upper surface of the housing unit 21 of the gaming machine 20, and as shown in FIG. 5, is disposed on a side of the lower surface of the base portion 12*a* of the base unit 12. The motor 15 rotates the entire illumination device 10 on the upper surface of the housing unit 21 of the gaming machine 20.

Also, the start and stop of rotation, the rotation speed, the rotation direction, and so forth of the motor 15 are controlled by the control unit 16.

Consequently, the motor 15 can switch the orientation of the illumination device 10 so as to orient the infinity mirror unit 11, orient the roulette unit 14 on the opposite side, or orient the reel 13*a* side of the reel unit 13 on the side thereof, toward a position at the front that is opposite the player who is playing the gaming machine 20.

Also, by continuously rotating the entire illumination device 10 with the motor 15, various effects, such as the infinity mirror effect of the infinity mirror unit 11, or an effect produced by light and the rotation of the reel unit 13 and the roulette unit 14, can be further enhanced.

Light Effect Control by Control Unit 16

Figure 2:
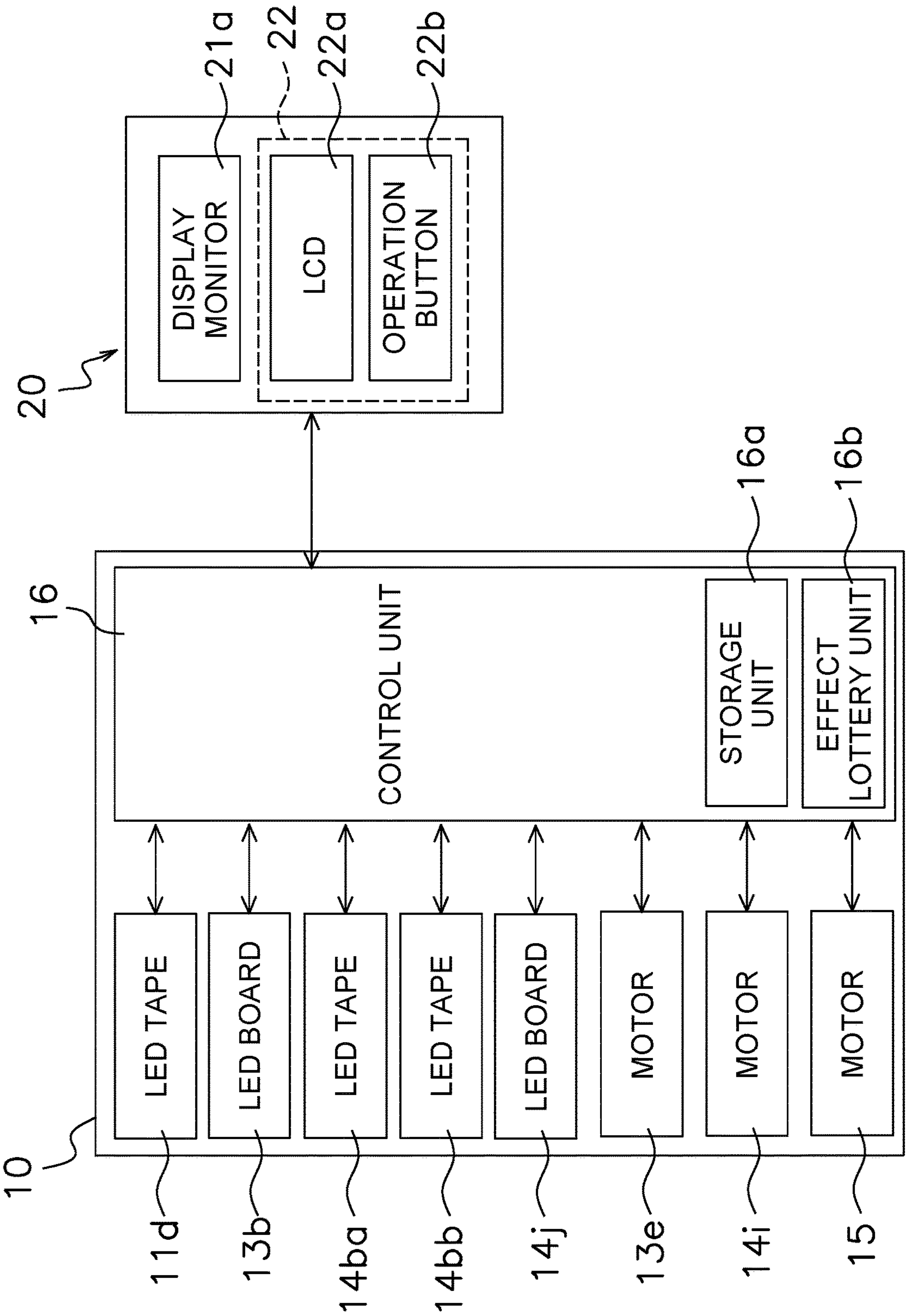
FIG. 2 is a control block diagram of the illumination device in FIG. 1.

With the illumination device 10 in this embodiment, as shown in FIG. 2, the control unit 16 controls the light sources (LEDs 11*da*, 14*ja*, etc.) included in the infinity mirror unit 11, the base unit 12, the reel unit 13, and the roulette unit 14 to produce a light effect.

More specifically, the control unit 16 controls the LED tape 14*bb* so as to switch the display of a plurality of graphics on the substantially circular surface of the reel 13*a* by allowing or not allowing light to be incident on the incident surface of the light guide plate 14*e* according to state of game play of the gaming machine 20 (result of a jackpot lottery, etc.), for example.

Figure 15B:
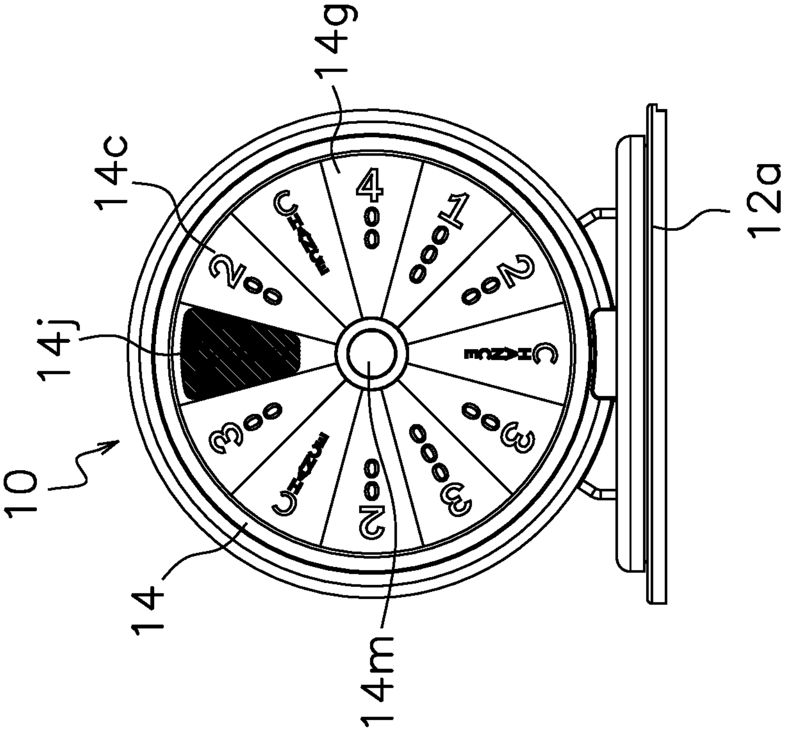
FIG. 15B is a diagram showing a state in which an LED that irradiates the light guide plate with light is turned off and an LED on the back side of the roulette wheel is turned on, as a display on the roulette unit side.
Figure 15A:
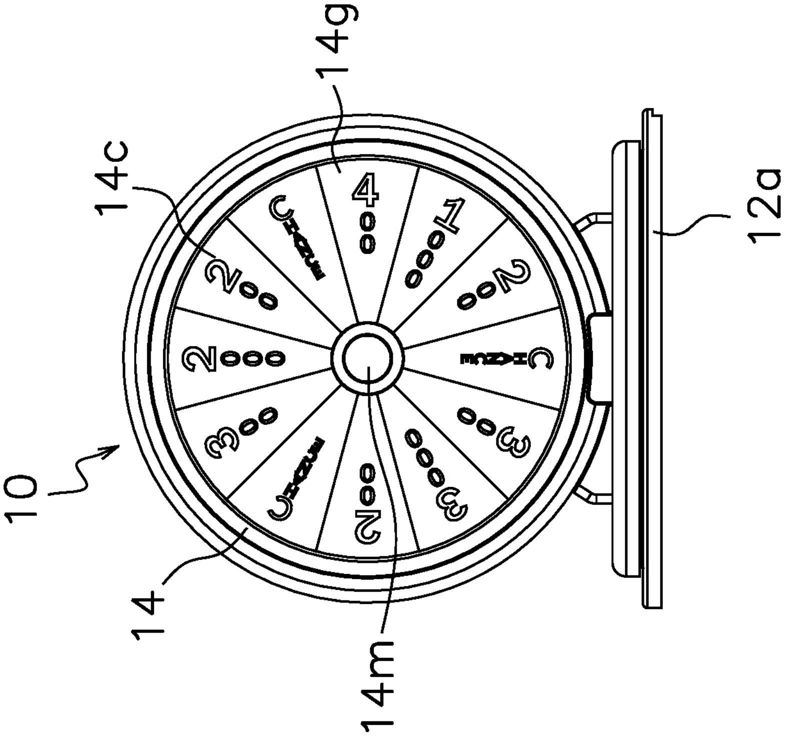
FIG. 15A is a diagram showing a state in which an LED that irradiates the light guide plate with light is turned off, and an LED on the back side of the roulette wheel is turned off, as a display on the roulette unit side.

For example, when the control unit 16 controls the LED tape 14*bb* so as not to irradiate the light guide plate 14*e* with light, as shown in FIG. 15A, the light goes through the light guide plate 14*e* and the roulette graphics of the roulette wheel 14*c* disposed on the back side of the light guide plate 14*e* are displayed.

At this point, the LED tape 14*ba* illuminates the surface of the roulette wheel 14*c* with white light, so that the roulette graphics on the roulette wheel 14*c* can be clearly recognized when the roulette unit 14 is viewed from the front.

Also, at this point, the control unit 16 controls the LEDs 14*ja* of the LED board 14*j* so that a part of the roulette graphics on the roulette wheel 14*c* is displayed as the lottery result.

In this embodiment, as shown in FIG. 15B, in a lottery with the roulette unit 14, the graphic stopped at the 12 o'clock position of the roulette wheel 14*c* is illuminated by the LEDs 14*ja* of the LED board 14*j* disposed on the back side, and is displayed as the lottery result.

Figure 16A:
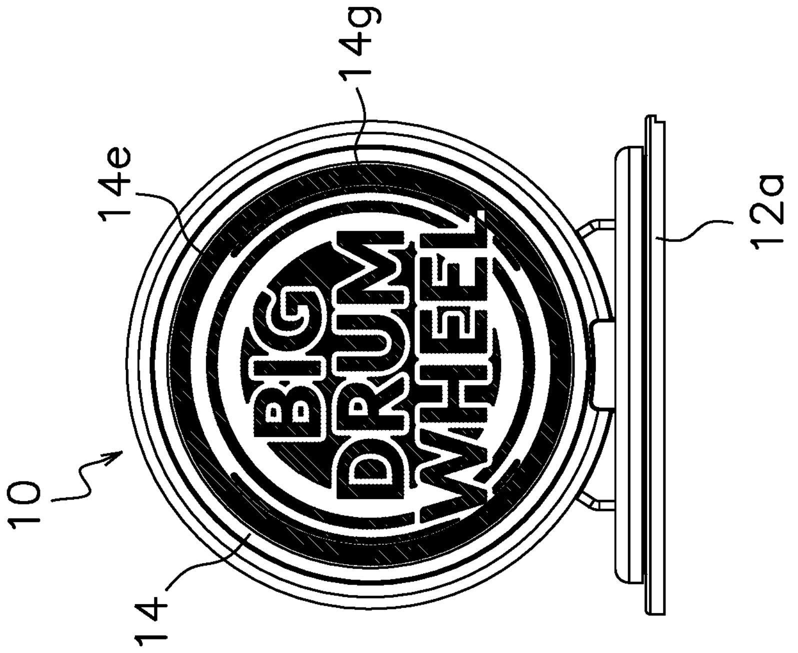
FIG. 16A is a diagram showing a state in which an LED that irradiates the light guide plate with light is turned on, and an LED on the back side of the roulette wheel is turned off, as a display on the roulette unit side.

On the other hand, for example, when the control unit 16 controls the LED tape 14*bb* so as to irradiate the light guide plate 14*e* with light, as shown in FIG. 16A, a specific graphic is displayed by the light reflected by a plurality of prisms that are arranged in a specific pattern on the light guide plate 14*e* and reflect, in a specific direction, the light emitted from the LED tape 14*bb* onto the incident surface.

Consequently, a specific graphic is displayed by light reflected by the plurality of prisms that are arranged in a specific pattern on the light guide plate 14*e* and reflect, in a specific direction, the light emitted from the LED tape 14*bb* to the incident surface. In this state, the control unit 16 controls the LEDs 14*ja* of the LED board 14*j* so as to display a part of the roulette graphics on the roulette wheel 14*c*, so that a larger amount of light is emitted than the light from the LED tape 14*bb* and incident on the light guide plate 14*e*.

Figure 16B:
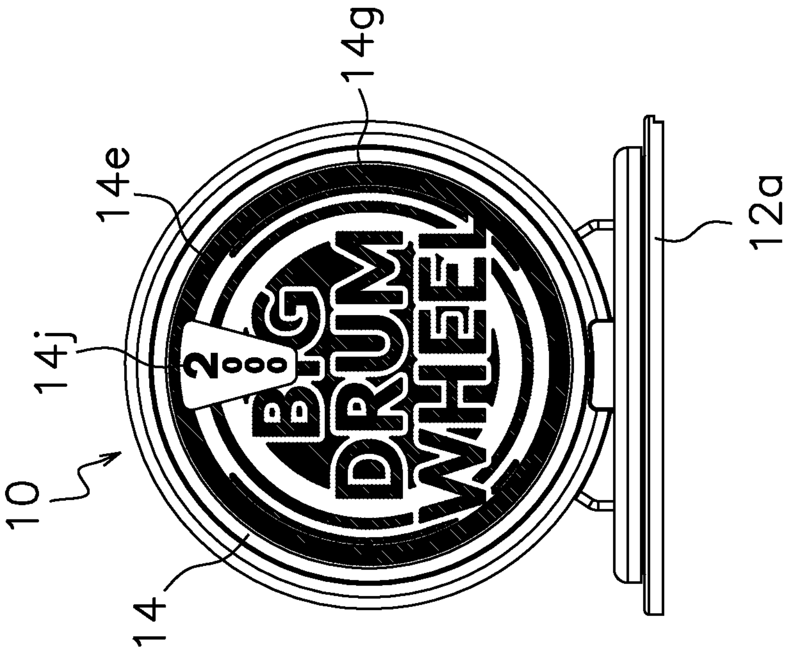
FIG. 16B is a diagram showing a state in which an LED that irradiates the light guide plate with light is turned on, and an LED on the back side of the roulette wheel is also turned on, as a display on the roulette unit side.

As a result, as shown in FIG. 16B, the light goes through a part of a specific graphic, and a part of the roulette graphics on the roulette wheel 14*c* is displayed. Therefore, the player of the gaming machine 20 will feel more excitement upon hitting a jackpot lottery because the displayed portion is only the part of the roulette graphics on the roulette wheel 14*c* that displays the result of the lottery.

At this point, control may be performed to switch between illuminating and not illuminating the end surface of the light guide plate 14*e* with the light from the LED tape 14*bb* so as to display or hide the roulette graphics of the roulette wheel 14*c* while the roulette wheel 14*c* is rotating.

This allows the player to feel even more excitement while waiting for the lottery result on the roulette unit 14.

Furthermore, if the control unit 16 controls the LED tape 14*bb* so that light does not irradiate the light guide plate 14*e* on the surface on the roulette unit 14 side, the roulette graphics on the roulette wheel 14*c* disposed on the back side of the light guide plate 14*e* will be displayed through the light guide plate 14*e*. Then, in this state, the control unit 16 controls the LED tape 14*ba* so as to irradiate the surface of the roulette graphics with white light.

Consequently, the roulette wheel 14*c* displayed on the surface on the roulette unit 14 side is brightly illuminated, making it easy for the player playing the gaming machine 20 to see the roulette wheel.

Also, the control unit 16 controls the lighting of the LEDs 11*da* of the LED tape 11*d* in order to produce an infinity mirror effect in the infinity mirror unit 11.

This allows switching between the display of the graphic formed on the design sheet 1*b* shown in FIG. 10A and the light display that provides a sense of depth as an infinity mirror as shown in FIG. 10B.

Main Feature 1

The illumination device 10 of this embodiment is installed in the gaming machine 20, and comprises the reel 13*a*, the motor 13*e*, the roulette wheel 14*c*, the motor 14*i*, and the LED tapes 14*ba* and 14*bb*. The reel 13*a* has a substantially cylindrical shape, rotates around a rotary shaft, and has a substantially circular front surface, a rear surface disposed opposite the front surface, and an outer peripheral surface that connects the front surface and the rear surface. The motor 13*e* and the reel 13*a* are rotated around a substantially cylindrical center shaft. The roulette wheel 14*c* is provided inside the reel 13*a* when viewed from the rear side, and has roulette graphics formed thereon. The center of rotation of the motor 14*i* is the center of the roulette wheel 14*c*. The LED tapes 14*ba* and 14*bb* are provided on the reel 13*a*, and produce effects with light.

Consequently, by combining the rotation of the reel 13*a*, the rotation of the roulette wheel 14*c* provided inside the reel 13*a*, and the light effect produced by the LED tapes 14*ba* and 14*bb* provided to the reel 13*a*, it is possible to produce a wide variety of effects to match the state of play on the gaming machine 20 without having to use a liquid crystal display panel or the like.

As a result, a three-dimensional and distinctive effect can be obtained.

Main Feature 2

The illumination device 10 of this embodiment is installed in the gaming machine 20, and comprises the reel 13*a*, the roulette wheel 14*c*, the motor 14*i*, the LED tape 14*bb*, the light guide plate 14*e*, and the control unit 16. The roulette wheel 14*c* is provided to the reel 13*a* and has a first graphic formed on its front surface. The center of rotation of the motor 14*i* is the center of the roulette wheel 14*c*. The LED tape 14*bb* is provided on the front side of the roulette wheel 14*c* in the reel 13*a*, and emits light in a specific direction. The light guide plate 14*e* is provided on the front side of the roulette wheel 14*c* in the reel 13*a*, and has an incident surface on which light emitted from the LED tape 14*bb* is incident and an exit surface from which the light incident from the incident surface is emitted. The control unit 16 controls the LED tape 14*bb* so as to switch between a display produced by the light guide plate 14*e* and the display of the roulette graphics on the roulette wheel 14*c*, depending on whether the incident surface of the light guide plate 14*e* is lit or unlit, according to the state of play on the gaming machine 20.

Here, for example, in the illumination device 10 that is installed in the gaming machine 20 located a casino or other such gaming facility and produces various effects, the light guide plate 14*e* that performs a desired display when light is incident thereon from the LED tape 14*bb* is disposed on the front side of the roulette wheel 14*c* on which the roulette graphics are drawn.

Consequently, the desired display can be produced on the light guide plate 14*e* by allowing light from the LED tape 14*bb* to be incident on the incident surface of the light guide plate 14*e*, and the roulette graphics of the roulette wheel 14*c* disposed on the back side of the light guide plate 14*e* can be displayed through the light guide plate 14*e* by turning off the LED tape 14*bb*.

Consequently, switching the light of the LED tape 14*bb* on or off allows for switching between a display produced by the light guide plate 14*e* and a display of the roulette graphics on the roulette wheel 14*c*.

As a result, a three-dimensional and distinctive effect can be obtained.

Other Embodiments

An embodiment of the present invention was described above, but the present invention is not limited to the above embodiment, and various modifications are possible without departing from the gist of the invention.

(A)

In the above embodiment, an example was given in which upon receiving a jackpot signal from the gaming machine 20, the effect lottery unit 16*b* of the control unit 16 determined what kind of effect is to be performed in the illumination device 10, and based on that determination, controlled the light source units and the motors, thereby producing a wide variety of effects. However, the present invention is not limited to this.

For example, the illumination device may be installed as a single component of the gaming machine and be controlled by the control unit of the gaming machine.

(B)

In the above embodiment, an example was given in which the control unit 16 of the illumination device 10 controlled the lighting of the LED tapes 11*d*, 14*ba*, and 14*bb* and the LED boards 13*b* and 14*j*. However, the present invention is not limited to this.

For example, the configuration may be such that a separate control unit is provided for each light source unit.

(C)

In the above embodiment, an example was given in which the control unit 16 of the illumination device 10 controlled the rotation of the three motors 13*e*, 14*i*, and 15. However, the present invention is not limited to this.

For example, the configuration may be such that a separate control unit is provided for each motor.

(D)

In the above embodiment, an example was given in which the graphics for the jackpot lottery were displayed on the outer peripheral surface of the substantially cylindrical reel (rotating body) 13*a*. However, the present invention is not limited to this.

For example, graphics that heighten the player's sense of immersion in the game may be displayed on the outer peripheral surface of the rotating body, rather than those for a jackpot lottery.

(E)

In the above embodiment, an example was given in which the roulette wheel 14*c* that was rotationally driven to perform a jackpot lottery was provided on one side surface of the reel (rotating body) 13*a*. However, the present invention is not limited to this.

For example, graphics that heighten the player's sense of immersion in the game may be displayed on the surface of the roulette wheel, rather than those for a jackpot lottery.

(F)

In the above embodiment, an example was given in which the infinity mirror unit 11 was disposed on the other side surface of the reel (rotating body) 13*a*. However, the present invention is not limited to this.

For example, the decorative illumination unit disposed on the side surface of the rotating body may be a decorative illumination unit having a decorative illumination function apart from the infinity mirror unit.

(G)

In the above embodiment, an example was given in which the design sheet 11*b* of the infinity mirror unit 11 displayed the specific characters "OMRON.". However, the present invention is not limited to this.

For example, what is displayed on the design sheet may be other text information, or something else may be displayed, such as a design or image.

(H)

In the above embodiment, an example was given in which a slot machine was used as the gaming machine in which the illumination device 10 was installed. However, the present invention is not limited to this.

For example, the illumination device may be installed in a gaming machine other than a slot machine.

INDUSTRIAL APPLICABILITY

The illumination device of the present invention allows three-dimensional and distinctive effects to be produced, and therefore can be widely applied as an illumination device that is installed in any of various devices.

The invention claimed is:

1. An illumination device installed in a gaming machine, comprising:

a rotating body that has a substantially cylindrical shape and configured to rotate around a rotary shaft, and that has a substantially circular first side surface, a second side surface that is disposed opposite the first side surface, and an outer peripheral surface that connects the first side surface and the second side surface;

a first rotary drive unit configured to rotate the rotating body around a substantially cylindrical center shaft;

a disk-shaped member that is provided inside the rotating body when viewed from a side of the first side surface and has a first graphic formed thereon;

a second rotary drive unit configured to rotate the disk-shaped member as a rotational center of a center of the disk-shaped member;

a decorative illumination unit that is provided to the rotating body and gives an effect with light, and a first display control unit configured to control the first light source unit so as to switch a display of a plurality of graphics on the substantially circular first side surface of the rotating body depending on whether or not the incident surface of the light guide plate is lit, according to a state of play on the gaming machine, wherein the decorative illumination unit comprises:

a first light source unit that emits light in a specific direction; and a light guide plate that has an incident surface on which the light emitted from the first light source unit is incident and an exit surface from which the light incident from the incident surface is emitted, and that is disposed on a side of the disk-shaped member on which the first graphic is formed, on the first side surface, the first display control unit:

causes a second graphic to be displayed by the light reflected by a plurality of prisms that are disposed in a specific pattern on the light guide plate and reflect, in a specific direction, the light emitted from the first light source unit onto the incident surface when the first light source unit is controlled so as to irradiate the light guide plate with light, and causes the first graphic of the disk-shaped member disposed on a back side of the light guide plate to be displayed through the light guide plate when the first light source unit is controlled so as not to irradiate the light guide plate with light.

2. The illumination device according to claim 1, wherein the decorative illumination unit further has a second light source unit that is disposed on a back side of the disk-shaped member and emits light toward a part of the disk-shaped member, and the illumination device further comprises a second display control unit configured to control the second light source unit so as to display part of a graphic of the disk-shaped member.

3. The illumination device according to claim 1, wherein the first display control unit controls the first light source unit to irradiate the light guide plate with light on the first side surface, and causes a second graphic to be displayed by the light reflected by a plurality of prisms that are disposed in a specific pattern on the light guide plate and that reflect, in a specific direction, the light emitted from the first light source unit onto the incident surface, and in this state, the second display control unit controls the second light source unit to display part of the graphic on the disk-shaped member, whereupon a part of the first graphic on the disk-shaped member is displayed on the first side surface through a part of the second graphic.

4. The illumination device according to claim 1, wherein the decorative illumination unit further has a design sheet that is provided on a side of the second side surface of the rotating body, has a specific graphic formed thereon, blocks light from the second side surface, and transmits light from the first side surface.

5. The illumination device according to claim 4, wherein the decorative illumination unit further has a reflector that is disposed on a back side of the design sheet when viewed from a side of the second side surface, and reflects light from a side of the design sheet.

6. An illumination device installed in a gaming machine, comprising:

a rotating body that has a substantially cylindrical shape and configured to rotate around a rotary shaft, and that has a substantially circular first side surface, a second side surface that is disposed opposite the first side surface, and an outer peripheral surface that connects the first side surface and the second side surface;

a first rotary drive unit configured to rotate the rotating body around a substantially cylindrical center shaft;

a disk-shaped member that is provided inside the rotating body when viewed from a side of the first side surface and has a first graphic formed thereon;

a second rotary drive unit configured to rotate the disk-shaped member as a rotational center of a center of the disk-shaped member; and a decorative illumination unit that is provided to the rotating body and gives an effect with light, and a first display control unit configured to control the first light source unit so as to switch a display of a plurality of graphics on the substantially circular first side surface of the rotating body depending on whether or not the incident surface of the light guide plate is lit, according to a state of play on the gaming machine, wherein the decorative illumination unit comprises:

a first light source unit that emits light in a specific direction;

a light guide plate that has an incident surface on which the light emitted from the first light source unit is incident and an exit surface from which the light incident from the incident surface is emitted, and that is disposed on a side of the disk-shaped member on which the first graphic is formed;

a fifth light source unit configured to emit light onto a surface of the first graphic of the disk-shaped member; and a fifth display control unit configured to control the fifth light source unit so as to irradiate the surface of the first graphic with light in a state in which the first display control unit controls the first light source unit so as not to irradiate the light guide plate on the first side surface, and the first graphic of the disk-shaped member disposed on a back side of the light guide plate is displayed through the light guide plate.

7. An illumination device installed in a gaming machine, comprising:

a rotating body that has a substantially cylindrical shape and configured to rotate around a rotary shaft, and that has a substantially circular first side surface, a second side surface that is disposed opposite the first side surface, and an outer peripheral surface that connects the first side surface and the second side surface;

a first rotary drive unit configured to rotate the rotating body around a substantially cylindrical center shaft;

a disk-shaped member that is provided inside the rotating body when viewed from a side of the first side surface and has a first graphic formed thereon;

a second rotary drive unit configured to rotate the disk-shaped member as a rotational center of a center of the disk-shaped member; and a decorative illumination unit that is provided to the rotating body and gives an effect with light, wherein the decorative illumination unit comprises:

a design sheet that is provided on a side of the second side surface of the rotating body, has a specific graphic formed thereon, blocks light from the second side surface, and transmits light from the first side surface;

a reflector that is disposed on a back side of the design sheet when viewed from a side of the second side surface, and reflects light from a side of the design sheet;

a third light source unit that is provided in a space between the design sheet and the reflector inside the rotating body and emits light in a desired direction; and a third display control unit that controls the third light source unit so as to switch the light on or off.

8. The illumination device according to claim 7, wherein the reflector reflects the light emitted from the third light source unit toward the second side surface, and the light reflected by the reflector is transmitted through the design sheet provided on a side of the second side surface.

9. An illumination device installed in a gaming machine, comprising:

a rotating body that has a substantially cylindrical shape and configured to rotate around a rotary shaft, and that has a substantially circular first side surface, a second side surface that is disposed opposite the first side surface, and an outer peripheral surface that connects the first side surface and the second side surface;

a first rotary drive unit configured to rotate the rotating body around a substantially cylindrical center shaft;

a disk-shaped member that is provided inside the rotating body when viewed from a side of the first side surface and has a first graphic formed thereon;

a second rotary drive unit configured to rotate the disk-shaped member as a rotational center of a center of the disk-shaped member; and a decorative illumination unit that is provided to the rotating body and gives an effect with light, wherein the decorative illumination unit comprises a fourth light source unit configured to emit light from a side of an inner peripheral surface of the rotating body, and the illumination device further comprises a fourth display control unit configured to control the fourth light source unit so as to display a specific graphic on the outer peripheral surface of the rotating body.

10. An illumination device installed in a gaming machine, comprising:

a rotating body that has a substantially cylindrical shape and configured to rotate around a rotary shaft, and that has a substantially circular first side surface, a second side surface that is disposed opposite the first side surface, and an outer peripheral surface that connects the first side surface and the second side surface;

a first rotary drive unit configured to rotate the rotating body around a substantially cylindrical center shaft;

a disk-shaped member that is provided inside the rotating body when viewed from a side of the first side surface and has a first graphic formed thereon;

a second rotary drive unit configured to rotate the disk-shaped member as a rotational center of a center of the disk-shaped member;

a decorative illumination unit that is provided to the rotating body and gives an effect with light;

a base portion configured to support the rotating body so as to be rotatable by the first rotary drive unit; and a third rotary drive unit configured to rotate the rotating body supported by the base portion around a rotary shaft disposed along a substantially vertical direction.

11. An illumination device installed in a gaming machine, comprising:

a rotating body that has a substantially cylindrical shape and configured to rotate around a rotary shaft, and that has a substantially circular first side surface, a second side surface that is disposed opposite the first side surface, and an outer peripheral surface that connects the first side surface and the second side surface;

a first rotary drive unit configured to rotate the rotating body around a substantially cylindrical center shaft;

a disk-shaped member that is provided inside the rotating body when viewed from a side of the first side surface and has a first graphic formed thereon;

a second rotary drive unit configured to rotate the disk-shaped member as a rotational center of a center of the disk-shaped member; and a decorative illumination unit that is provided to the rotating body and gives an effect with light, wherein the rotating body includes a first lottery unit for performing a jackpot lottery, on a substantially cylindrical outer peripheral surface thereof.

12. An illumination device installed in a gaming machine, comprising:

a rotating body that has a substantially cylindrical shape and configured to rotate around a rotary shaft, and that has a substantially circular first side surface, a second side surface that is disposed opposite the first side surface, and an outer peripheral surface that connects the first side surface and the second side surface;

a first rotary drive unit configured to rotate the rotating body around a substantially cylindrical center shaft;

a disk-shaped member that is provided inside the rotating body when viewed from a side of the first side surface and has a first graphic formed thereon;

a second rotary drive unit configured to rotate the disk-shaped member as a rotational center of a center of the disk-shaped member; and a decorative illumination unit that is provided to the rotating body and gives an effect with light, wherein the first graphic of the disk-shaped member includes a second lottery unit configured to perform a jackpot lottery.

13. An illumination device installed in a gaming machine, comprising:

a rotating body that has a substantially cylindrical shape and configured to rotate around a rotary shaft, and that has a substantially circular first side surface, a second side surface that is disposed opposite the first side surface, and an outer peripheral surface that connects the first side surface and the second side surface;

a first rotary drive unit configured to rotate the rotating body around a substantially cylindrical center shaft;

a disk-shaped member that is provided inside the rotating body when viewed from a side of the first side surface and has a first graphic formed thereon;

a second rotary drive unit configured to rotate the disk-shaped member as a rotational center of a center of the disk-shaped member;

a decorative illumination unit that is provided to the rotating body and gives an effect with light; and an effect lottery unit configured to perform a lottery to determine a content of the effect when a jackpot signal is received from the gaming machine.

14. A gaming machine, comprising:

an illumination device installed in a gaming machine, comprising:

a rotating body that has a substantially cylindrical shape and configured to rotate around a rotary shaft, and that has a substantially circular first side surface, a second side surface that is disposed opposite the first side surface, and an outer peripheral surface that connects the first side surface and the second side surface;

a first rotary drive unit configured to rotate the rotating body around a substantially cylindrical center shaft;

a disk-shaped member that is provided inside the rotating body when viewed from a side of the first side surface and has a first graphic formed thereon;

a second rotary drive unit configured to rotate the disk-shaped member as a rotational center of a center of the disk-shaped member; and a decorative illumination unit that is provided to the rotating body and gives an effect with light;

a housing unit in which the illumination device is installed;

a display unit that is provided on a front surface of the housing unit to indicate a game state; and an operation deck that is provided on a front of the housing unit and at a lower part of the display unit, and on which operation inputs made by a player are performed.

* * * * *